(12) United States Patent
Lee

(10) Patent No.: US 10,597,936 B2
(45) Date of Patent: Mar. 24, 2020

(54) TRACKING-TYPE WINDOW BLIND APPARATUS USING SOLAR MODULES

(71) Applicant: SOLEGRID INC., Yuseong-gu (KR)

(72) Inventor: Sang Jin Lee, Daejeon (KR)

(73) Assignee: SOLEGRID INC., Daejeon-si (KR)

( * ) Notice: Subject to any disclaimer, the term of this patent is extended or adjusted under 35 U.S.C. 154(b) by 0 days.

(21) Appl. No.: 16/084,829

(22) PCT Filed: Nov. 24, 2016

(86) PCT No.: PCT/KR2016/013664
§ 371 (c)(1),
(2) Date: Sep. 13, 2018

(87) PCT Pub. No.: WO2017/175946
PCT Pub. Date: Oct. 12, 2017

(65) Prior Publication Data
US 2019/0055779 A1     Feb. 21, 2019

(30) Foreign Application Priority Data

Apr. 6, 2016    (KR) .......................... 10-2016-0042449

(51) Int. Cl.
*E06B 9/322*     (2006.01)
*E06B 9/24*     (2006.01)
(Continued)

(52) U.S. Cl.
CPC ............... *E06B 9/322* (2013.01); *E06B 9/24* (2013.01); *E06B 9/30* (2013.01); *H02S 20/32* (2014.12); *E06B 2009/2476* (2013.01)

(58) Field of Classification Search
None
See application file for complete search history.

(56) References Cited

U.S. PATENT DOCUMENTS

| | | | |
|---|---|---|---|
| 6,239,910 B1 * | 5/2001 | Digert ....................... | E06B 9/28 160/104 |
| 8,365,800 B2 * | 2/2013 | Oh .......................... | E06B 9/322 160/168.1 P |

(Continued)

FOREIGN PATENT DOCUMENTS

| | | |
|---|---|---|
| CN | 103437685 A | 12/2013 |
| JP | 2009270382 A | 11/2009 |

(Continued)

*Primary Examiner* — Katherine W Mitchell
*Assistant Examiner* — Abe Massad

(57) ABSTRACT

An exemplary embodiment provides a tracking-type window blind apparatus using solar modules. The window blind apparatus includes a plurality of sunshades which are separated from each other by a predetermined distance and adjust a light transmission amount; solar modules which are respectively attached to the plurality of sunshades and generating power by using solar light; a driver which is connected with the plurality of sunshades to adjust an inclination angle of each sunshade and a distance between the sunshades; and a controller which sets one of operation modes among a power generation mode, a privacy protection mode, and a lighting mode according to a user's command, and controls the inclination of each sunshade and the distance between the sunshades according to the set operation mode, a current season and time, and a solar altitude angle.

6 Claims, 20 Drawing Sheets

(51) Int. Cl.
    *E06B 9/30*     (2006.01)
    *H02S 20/32*    (2014.01)

(56) References Cited

U.S. PATENT DOCUMENTS

| | | | | |
|---|---|---|---|---|
| 8,678,067 | B2* | 3/2014 | Berezhnyy | E06B 9/24 |
| | | | | 160/1 |
| 8,678,069 | B2* | 3/2014 | Choi | E06B 9/264 |
| | | | | 160/107 |
| 9,163,452 | B2* | 10/2015 | Zhang | E06B 9/386 |
| 2003/0168056 | A1* | 9/2003 | Fidler | E06B 9/386 |
| | | | | 126/628 |
| 2014/0016191 | A1* | 1/2014 | Yeh | G02B 5/208 |
| | | | | 359/361 |
| 2015/0101761 | A1 | 4/2015 | Moslehi et al. | |
| 2017/0138124 | A1* | 5/2017 | Kanno | E06B 9/386 |
| 2018/0195766 | A1* | 7/2018 | Cheun | E06B 9/264 |

FOREIGN PATENT DOCUMENTS

| | | |
|---|---|---|
| JP | 2010-258023 A | 11/2010 |
| KR | 10-0321805 B1 | 2/2002 |
| KR | 20090105899 A | 10/2009 |
| KR | 2010-0072941 A | 7/2010 |
| KR | 2010-0116959 A | 11/2010 |
| KR | 2011-0027196 A | 3/2011 |
| KR | 10-1055218 B1 | 8/2011 |
| KR | 20110087202 A | 8/2011 |
| KR | 20120001065 A | 1/2012 |
| KR | 20120005311 A | 1/2012 |
| KR | 10-1110941 B1 | 2/2012 |
| KR | 20120030183 A | 3/2012 |
| KR | 2012-0037677 A | 4/2012 |
| KR | 10-1147331 B1 | 5/2012 |
| KR | 20120053753 A | 5/2012 |
| KR | 2012-0091998 A | 8/2012 |
| KR | 10-1194197 B1 | 10/2012 |
| KR | 10-1250437 B1 | 4/2013 |
| KR | 20130106991 A | 10/2013 |
| KR | 20130114378 A | 10/2013 |
| KR | 10-1347783 B1 | 1/2014 |
| KR | 10-1361326 B1 | 2/2014 |
| KR | 10-1377261 B1 | 3/2014 |
| KR | 10-1389916 B1 | 4/2014 |
| KR | 10-1459069 B1 | 11/2014 |
| KR | 10-1470119 B1 | 12/2014 |
| KR | 10-1529678 B1 | 6/2015 |
| KR | 10-1551722 B1 | 9/2015 |
| KR | 10-1553767 B1 | 9/2015 |
| KR | 20150130180 A | 11/2015 |
| KR | 10-1586208 B1 | 1/2016 |

* cited by examiner (a)  (b)  (c)

(a)

(b)

(a)

(b)

(a)            (b)

(c)            (d)

(a)

(b) ∠b2=90°

(c) ∠b2=0°

(d) ∠b2=-90°

TRACKING-TYPE WINDOW BLIND APPARATUS USING SOLAR MODULES

CROSS-REFERENCE TO RELATED APPLICATIONS

This application is the U.S. national stage of PCT/KR2016/013664 filed on Nov. 24, 2016, which claims priority of Korean Patent Application No. 10-2016-0042449 filed on Apr. 6, 2016.

FIELD OF THE INVENTION

The present disclosure relates to a tracking-type window blind apparatus using solar modules. More particularly, the tracking-type window blind apparatus operates sunshades to which the solar module is attached or not, based on an operation mode, a current season and time, and a solar altitude angle. The tracking-type window blind apparatus individually controls the distance between sunshades or the inclination angle of sunshades.

BACKGROUND OF THE INVENTION

Photovoltaics (PV) do not require any particular maintenance and simply produces electricity using sunlight without pollution and corrosion of materials. There are various applications of PV. The technologies for building integration for using PV as exterior finishing materials have been in developing actively around the world.

In particular, building components that can be applied to integrate PV modules are very diverse, including curtain walls, ceilings, vehicles, PV roof tiles, and transparent PV windows. Depending on the characteristics, it can be used in natural light and vehicles, thus improve the overall energy saving effect, comfort, and economic feasibility of the building.

A building integrated photovoltaic (BIPV) system utilizes a location where sunlight enters the building and thus may have a structure that is combined with building components such as roofs, windows, exterior finishing materials, and the like. In particular, it is advantageous in that the structure is easy to integrate into a building, and the direction in which the incidence of sunlight can be traced is changed.

Accordingly, a solar photovoltaic window blind system that can combine shading and solar power by combining solar cell panels on sun shading plates or slats of a window blind system installed from outside to inside or from inside to outside has been proposed.

In general, if the PV window blind system is installed in a large-scale building with outer walls covered with glass, considerable renewable energy production and savings can be expected.

The PV window blind system requires a solar tracking function that follows an incident direction of sunlight to maximize solar power generation. Depending on a tracking method, the PV window blind system can be classified into a program tracking-type system and a sensor tracking-type system. The program tracking method stores and tracks the optimum sun position according to the year, month, and day using a computer or a microprocessor having a program for tracking the movement trajectory of the sun during the year. The sensor tracking method tracks the maximum incident amount using a sensor. The error may occur depending on the type and shape of the sensor.

Depending on a tracking direction, it can be classified into a slope single-axis (or horizontal single-axis) tracking system and a dual-axis tracking system. One axis of the dual-axis tracking system may trace the azimuth of the sun, and the other axis may trace an altitude angle of the sun. The slope single-axis tracking system is a system in which the axis is set at a constant inclination angle in the north-south direction and is rotated around the axis to track the sun. In the case of the slope single-axis tracking system, a power generation amount can be increased by only about 1%, even if tracking is done by the sensor method.

However, due to the nature of the window blind system, facing in the direction of the sun does not necessarily maximize the generation amount. For example, if the blind slates are toward the direction of the sun when the sun is at its meridian altitude in the mid-summer, the blind slats may be placed to be almost horizontal, and thus most areas of the blind slates may be shaded.

In addition, a wavelength range to which the optical sensor is sensitive is different from a wavelength range in which the actual power generation amount is high, and thus the identified sun direction does not necessarily guarantee the highest power generation. Furthermore, if the weather conditions are not good, a malfunction is inevitable. Accordingly, it is not cost-effective.

Solar power generation is most efficient when an angle (line) of a sunshade and a solar altitude angle (line) are orthogonal. In a general blind-type PV device, a distance between sunshades is one time "a width of the sunshade". For preventing shading by an adjacent sunshade, an inclination angle that makes the angle of the sunshade and the solar altitude angle perpendicular to each other should be smaller than 90°. Thus, in order to practically prevent shading, the inclination angle of the sunshade and the solar altitude angle forms an angle about 14° to 76° during most of the power generation time, and thus they are not orthogonal. Accordingly, the effect of the solar tracking device is greatly reduced.

As a prior art, a distance between slats is fixed at a manufacturing stage that louver has a fixed distance and blinds are withdrawn or overlapped with the fixed space. There was no variable simultaneous spacing means for distance between the slates to solve the shading problem between slats. More specifically, in a prior art, the distance between the slates may be controlled only by overlapping slats or withdrawing the slates. The lowest end in case of a prior horizontal blind system is sequentially pulled to adjust the spaces between the slates, and accordingly, the distances between the slates cannot be variably adjusted while operating the slates.

When the distance between slats is widened, no shading may occur between the slats, light enters through space between the slats at noon. Therefore the window blind having the wide distance between slats cannot provide sufficient the shading and the lighting. In order to maintain the natural shading and the lighting of the blind, it is possible to attach the solar modules partially to the areas where the slates or louvers do not shade. However, there is a problem to make the attached area of the solar cell reduced.

SUMMARY OF THE INVENTION

Exemplary embodiments have been made in an effort to solve problems of sun shielding, lighting, and shading in sunshades to optimize sunlight generation efficiency. Sunshades to which the solar module is attached are operated based on an operation mode, current season and time, and a solar altitude angle to control a distance between sunshades and an inclination angle of whole sunshade or part of sunshade, differently from each other.

In detail, exemplary embodiments provide a tracking-type window blind apparatus using solar modules, which can adjust a solar altitude angle, a distance between adjacent sunshades, and an inclination angle of sunshades in a power generation mode, to make the sunshades being closely perpendicular to the sunlight and prevent shading by adjacent shades. It improves power generation efficiency. In addition, the tracking-type window blind apparatus varies entering of direct or indirect sunlight to the room seasonally, to adjust indoor brightness and an indoor temperature.

In addition, the exemplary embodiments provide a tracking-type window blind apparatus using solar modules which can automatically and manually adjust an angle of sunshades and a distance between adjacent sunshades depending on a solar altitude angle.

In addition, the exemplary embodiments provide a tracking-type window blind apparatus using solar modules, of which each sunshade is divided into a first region where a solar module is attached and a second region where the solar module is not attached. The first region and the second region are individually rotated with reference to a rotation axis formed between the first region and the second region such that entering or blocking of sunlight can be determined according to a solar altitude angle through a bended portion of the sunshade.

[An exemplary embodiment provides a tracking-type window blind apparatus using solar modules. The window blind apparatus includes a plurality of sunshades which are separated from each other by a predetermined distance and adjust a light transmission amount; solar modules which are respectively attached to the plurality of sunshades and generates power by using solar light; a driver which is connected with the plurality of sunshades to adjust an inclination angle of each sunshade and a distance between the sunshades; and a controller which sets one of operation modes among a power generation mode, a privacy protection mode, and a lighting mode according to a user's command, and controls the inclination of each sunshade and the distance between the sunshades according to the set operation mode, a current season and time, and a solar altitude angle.

The plurality of sunshades may include at least one sunshade for power generation having the solar module, and at least one sunshade for privacy protection disposed to be adjacent to a lower end of the sunshade for power generation. The sunshade for privacy protection may not have the solar module. A distance between adjacent sunshades in the plurality of sunshades may be a predetermined multiple of a width of the sunshade.

When the set operation mode is the power generation mode and the solar altitude angle is smaller than a predetermined altitude angle, the controller may control the inclination angle of the sunshades to be perpendicular to the solar altitude angle and may control the distance between the sunshades to be a predetermined multiple of the width of the sunshade.

When the set operation mode is the highest level of the privacy protection mode, the controller may control the inclination angle of the sunshades to become a completely shielded state and may control2 the distance between the sunshades to be the width of the sunshade.

When the set operation mode is a lower level of the privacy protection mode and the solar altitude angle is smaller than a predetermined altitude angle, the controller may control the inclination angle of the sunshades to be perpendicular to the solar altitude angle, and may control the distance between the sunshades to prevent entering of direct sunlight.

When the set operation mode is a lighting mode and the solar altitude angle is smaller than a predetermined altitude angle, the controller may control the inclination angle of sunshades to be perpendicular to the solar altitude angle, and may control the distance between the sunshades to allow entering of direct sunlight.

When the solar altitude angle exceeds a predetermined altitude angle, the controller may control the inclination angle of sunshades to prevent shading in the sunshades, and may control the distance between the sunshades to be a predetermined multiple of the width of the sunshade.

Each of the plurality of sunshades may be divided into a first region to which the solar module is attached and a second region to which the solar module is not attached. The first region and the second region may individually operate with reference to a rotation axis formed between the first region and the second region.

Each of the plurality of sunshades may be separated into a first region to which the solar module is attached and a second region to which the solar module is not attached. The first region and the second region may rotate with reference to a virtual rotation axis formed between the first region and the second region.

The controller may individually control an inclination angle of a first region to which the solar module is attached and an inclination angle of a second region to which the solar module is not attached, to allow or block entering of direct sunlight, according to the set operation mode, the current season and time, and a comparison result between a solar altitude angle and a predetermined altitude angle.

According to the exemplary embodiments, the sunshades to which the solar modules is attached is operated based on an operation mode, a current season and time, and a solar altitude angle to control a distance between adjacent sunshades and an inclination angle of sunshades (whole shade or part of sunshade) to be different from each other. Problems in sun shielding, lighting, and shading in sunshades can be solved. Thereby sunlight power generation is optimized.

According to the exemplary embodiments, a solar altitude angle, a distance between sunshades, and an inclination angle of the sunshades are adjusted in a power generation mode. Since the angle (line) of the sunshade and the solar altitude angle (line) meet almost close to be perpendicular vertical, shading between sunshades are prevented. It improves power generation efficiency. In addition, it varies entering of direct or indirect sunlight to the room seasonally, to adjust indoor brightness and an indoor temperature.

In addition, according to the exemplary embodiments an angle of sunshades and a distance between adjacent sunshades can be automatically and manually adjusted depending on a solar altitude angle.

In addition, according to the exemplary embodiments, each sunshade is divided into a first region where a solar module is attached and a second region where the solar module is not attached. The first region and the second region are individually rotated with reference to a rotation axis formed between the first region and the second region such that entering or blocking of direct sunlight can be determined according to a solar altitude angle through a bended portion of the sunshade.

According to the exemplary embodiments, problems in sun shielding, lighting, and shading in sunshades can be solved, while maintaining an angle formed by an inclination angle (line) of the sunshade and a solar altitude angle (line)

to be close to perpendicular during most of time that power generation mode is available. Thereby power generation efficiency is optimized. That is, the exemplary embodiments are economic and effective since they satisfy the above-stated conditions and thus power generation efficiency can be more improved compared to a prior art.

DETAILED DESCRIPTION OF THE PREFERRED EMBODIMENTS

Brief Description of Symbols

Figure 1:
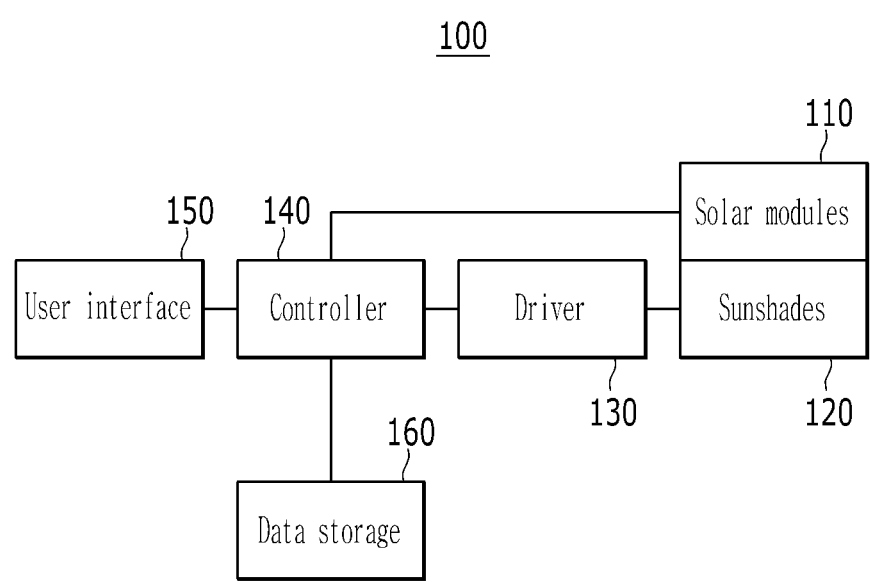
FIG. 1 is a schematic diagram illustrating a tracking-type window blind apparatus using a solar module according to an exemplary embodiment.

100: tracking-type window blind apparatus
110: solar module
120: sunshade
130: driver
140: controller
150: user interface
160: data storage Hereinafter, an exemplary embodiment will be described with reference to the accompanying drawings. It will be described in detail with reference to portions necessary for understanding the operation according to the present disclosure. When the embodiments are described, description of technical features which are well known in the technical field and are not directly related to the present disclosure will be omitted. This is to omit unnecessary explanation so as to more clearly describe the present disclosure without obscuring the gist thereof.

In description of the constituent elements, the same reference numerals may be designated to constituent elements having the same name, and the same reference numerals may be designated to different drawings. However, even in such a case, it does not mean that the corresponding components have different functions according to the embodiments, or that they have the same functions in different embodiments, and the functions of the respective components are not limited to the corresponding embodiments.

FIG. 1 is the schematic diagram illustrating a tracking-type window blind apparatus using solar modules according to an exemplary embodiment.

As shown in FIG. 1, a tracking-type window blind apparatus 100 includes solar modules 110, sunshades 120, a driver 130, and a controller 140. Here, the tracking-type window blind apparatus 100 may further include a user interface 150 and a data storage 160.

Hereinafter, detailed configurations and operations of each constituent element of the tracking-type window blind apparatus 100 using the solar modules 110 of FIG. 1 will be described.

The solar modules 110 are provided in each of the plurality of sunshades 120, and generate power by using sunlight. The solar modules 110 generate electricity with light entered thereto. Here, the solar modules 110 may be provided as a thin film (e.g., a copper-indium-gallium-selenide (CIGS) solar cell, cadmium telluride (CdTe), amorphous silicon (a-Si), and the like) module type.

Here, the plurality of sunshades 120 may further include output lines that electrically sequentially connect the solar modules 110 in series or in parallel and draw out electricity. Negative electrodes and positive electrodes of every neighboring sunshade 120, to which the solar modules 110 are respectively attached, may be coupled in series or parallel. The solar modules 110 may be coupled in series or parallel.

The plurality of sunshades 120 are apart from each other at predetermined distance, and adjust light amount of transmitting through the sunshades. The sunshades 120 are apart from each other at regular distance in a direction of a height of a window where the sunshades 120 are installed or a vertical direction of the sunshades 120 and adjust light amount of transmitting through the sunshades. For example, the plurality of sunshades 120 may be separated from each other at regular distance of twice as long as a width of the sunshade, that is, a vertical length of the sunshade. Here, the plurality of sunshades 120 may be adjusted to be separated from each other by one to two times a vertical length of the sunshade as necessary by the driver 130.

The driver 130 adjusts an inclination angle of the sunshades 120 and a distance between sunshades through an angle adjustment strap 123, an opening/closing adjustment strap 124, and a distance adjustment strap 125, each connected with the plurality of sunshades 120. The driver 130 may adjust a distance between the respective sunshades 120 or may adjust neighboring sunshades 120 to be overlapped with each other by changing an angle of each sunshade 120 or moving each sunshade 120.

Meanwhile, the controller 140 sets one operation mode among a power generation mode, a privacy protection mode, and a lighting mode according to a user's command, and controls an inclination angle of sunshades and a distance between sunshades, according to the set operation mode, a current season and time, and a comparison result of a solar altitude angle and a predetermined altitude angle (e.g., 60°). Here, the predetermined altitude angle is not limited to a specific angle, i.e., 60°, and can be variously modified.

An operation for controlling the inclination angle of sunshades and the distance between sunshades will now be described in detail. When the predetermined operation mode is the power generation mode and the solar altitude angle is smaller than the predetermined altitude angle, the controller 140 controls the sunshade inclination angle to be perpendicular to the solar altitude angle and controls the distance between the sunshades 120 to be a multiple of the width of the sunshade 120.

In addition, when the predetermined operation mode is the highest level (e.g., the first level) in the privacy protection mode, the controller 140 controls an inclination angle of sunshades to be in a completely closed or shielded state and controls the distance between the sunshades to be the width of the sunshade.

Meanwhile, when the predetermined operation mode is the lower level (e.g., the second level) in the privacy protection mode and the solar altitude angle is smaller than the predetermined altitude angle, the controller 140 controls the sunshade inclination angle to be perpendicular to the solar altitude and controls the distance between the sunshades to not let sunlight directly entered through the sunshades 120.

Meanwhile, when the predetermined operation mode is the lighting mode and the solar altitude angle is smaller than the predetermined altitude angle, the controller 140 controls the sunshade inclination angle to be perpendicular to the solar altitude and controls the distance between the sunshades to let sunlight directly entered through the sunshades 120.

When the solar altitude angle exceeds the predetermined altitude angle regardless of the operation mode of the window blind apparatus 100, the controller 140 controls the inclination angle of the sunshades to prevent shading of the sunshades and controls the distance between the sunshades to be a predetermined multiple of the width of the sunshade.

The user interface 150 receives the user command from a user. Here, the user interface 150 can receive the user command through a user terminal, a remote controller, and the like, which can be manipulated by the user. Thus, the user interface 150 may include a communication module for receiving of the user command through the user terminal or the remote controller. In addition, the user interface 150 may further include an input-output module for directly receiving a user command from the user or outputting a result of the user command or a current state.

The data storage 160 stores data for controlling the sunshades 120 where the solar module 110 is attached in the tracking-type window blind apparatus 100.

Meanwhile, the user can manually operate the tracking-type window blind apparatus 100 instead of using a programming control method. Seasons may be divided into 24 or 12 divisions, and thus the user may manually adjust the inclination angle of the sunshades 120 and the distance between the sunshades once or twice per month.

Such a manual operation does not require additional power. In addition, manufacturing cost of a tracking-type window blind apparatus providing manual operation can be more inexpensive compared to a tracking-type window blind apparatus 100 that cannot be manually operated. Compared to an automatically operated tracking-type window blind apparatus, a tracking-type window blind apparatus that can be manually operated has a relatively simple structure, thereby saving time and cost required for consumer service in case of failure.

Figure 2:
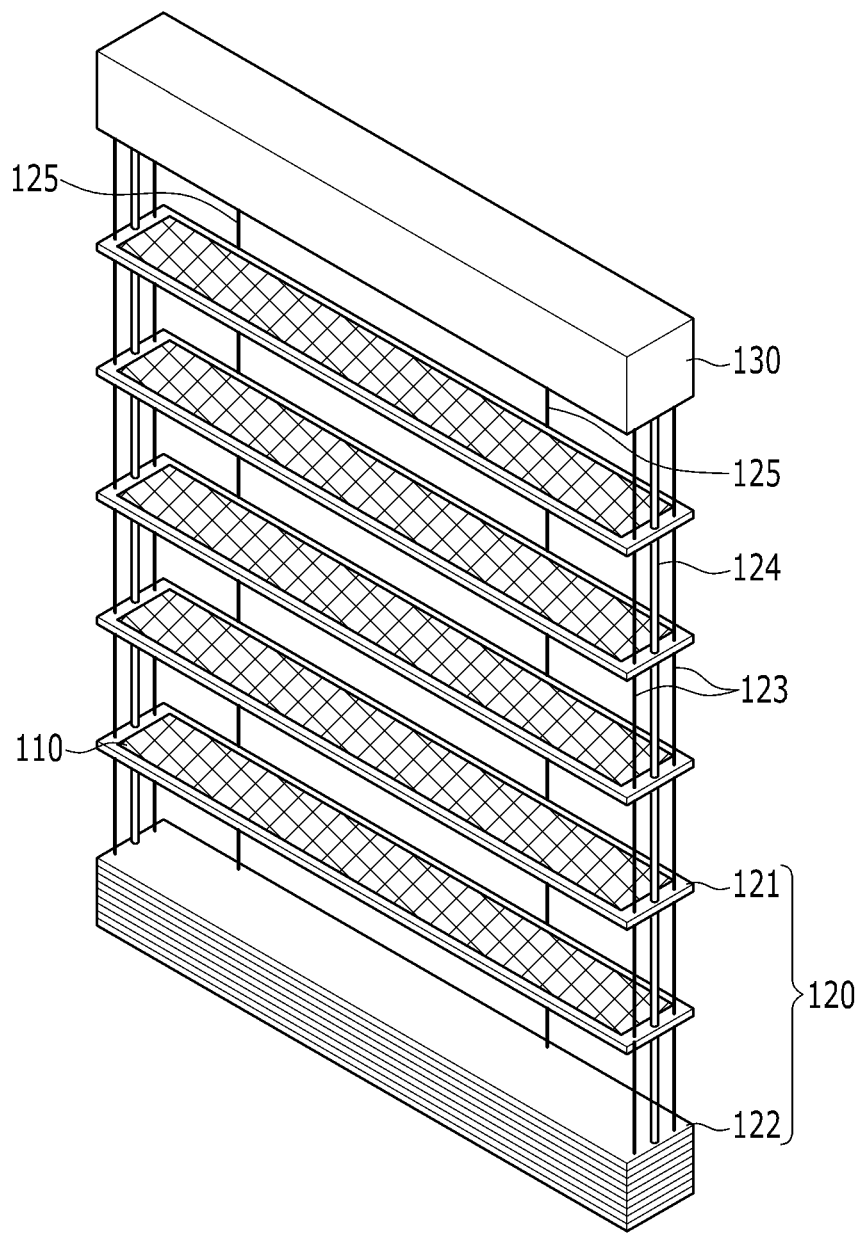
FIG. 2 is a configuration diagram illustrating a tracking-type window blind apparatus equipped with sunshades for power generation and sunshades for privacy protection according to a first exemplary embodiment.

FIG. 2 is a configuration diagram illustrating a tracking-type window blind apparatus equipped with sunshades for power generation and sunshades for privacy protection according to a first exemplary embodiment.

A tracking-type window blind apparatus 100 according to the first exemplary embodiment can control an angle and a distance of sunshades 121 for power generation and sunshades 122 for privacy protection depending on seasons, times, and operation modes. That is, such a tracking-type window blind apparatus 100 automatically adjusts a distance and an angle of the sunshades 121 for power generation and the sunshades 122 for privacy protection based on seasons and times.

As operating the sunshades 121 for power generation, the tracking-type window blind apparatus 100 controls a distance between the sunshades 121 and an inclination angle of the sunshades 121 for power generation to be almost perpendicular to the solar altitude angle, by setting an actual operation value on program.

The tracking-type window blind apparatus 100 receives a user command through a remote controller or a user terminal and sets a corresponding operation mode, and controls an inclination angle of the sunshades and a distance between sunshades according to the set operation mode, a current season and time, and a solar altitude angle.

Thus, the tracking-type window blind apparatus 100 may control the sunshade distance to be two times a width of the sunshade in a general power generation mode. In addition, the tracking-type window blind apparatus 100 operates in a privacy protection mode by using the sunshades 122 provided for privacy protection.

The tracking-type window blind apparatus 100 may have various operation modes, and selection of an operation mode can be carried by using a remote controller.

Referring to FIG. 2, the tracking-type window blind apparatus 100 includes at least one sunshade 121 for power generation and at least one sunshade 122 for privacy protection. The sunshade 121 for power generation has solar module 110 attached and a distance to an adjacent sunshades is a predetermined multiple of a width of the sunshade. The sunshades 122 for privacy protection are disposed of adjacent to a lower end of the sunshades 121 for power generation. The solar module is not attached to the sunshades 122 for privacy protection.

For example, the number of sunshades 122 for privacy protection may be more than one time the number of sunshades 121 for power generation.

When the tracking-type window blind apparatus 100 is in the power generation mode, the controller 140 may control the driver 130 to adjust the distance between the sunshades 121 for power generation to be two times the width of the sunshade 121.

In this case, when the distance between the sunshades 121 for power generation is two times the width of the sunshade 121, the tracking-type window blind apparatus 100 can prevent shading between the sunshades 121, thereby optimizing power generation efficiency.

Since a distance between the sunshades 121 for power generation of the tracking-type window blind apparatus 100 is wide, a temperature of the solar modules 110 can be decreased quickly by an indoor temperature even though a temperature at a surface of solar cells rises. Accordingly, deterioration of power generation efficiency due to an increased temperature of the solar modules 110 can be reduced, thereby power generation is optimized.

In addition, the tracking-type window blind apparatus 100 can easily adjust lighting and an indoor temperature. The tracking-type window blind apparatus 100 can easily assure sight and ventilation. Since the distance between the sunshades is more than two times the width of the sunshade, a user can see outside and thus feels less stuffy during power generation.

In this case, according to the exemplary embodiment, lighting and privacy protection are not sufficiently effective, and thus additional shading blind, double structure shading, or a curtain for privacy protection may be required for complete lighting and privacy protection.

However, in the tracking-type window blind apparatus 100, a distance between the sunshades is reduced to one time the width of the sunshade by using the sunshades 122 to which the solar module 110 is not attached, to thereby reinforce lighting and privacy protection. That is, in the tracking-type window blind apparatus 100, the sunshades 122 for privacy protection, disposed adjacent to a lower end of the sunshades 121 for power generation, are sequentially moved in a direction where the sunshades 121 for power generation are disposed, and a distance between sunshades 121 and a distance between sunshades 122 are respectively reduced to block sunlight.

Here, the sunshades 121 having solar modules 110 attached may be separated, in order to prevent a problem in power generation even through a horizontal side of the sunshades 121 away from a window is shaded.

Figure 3:
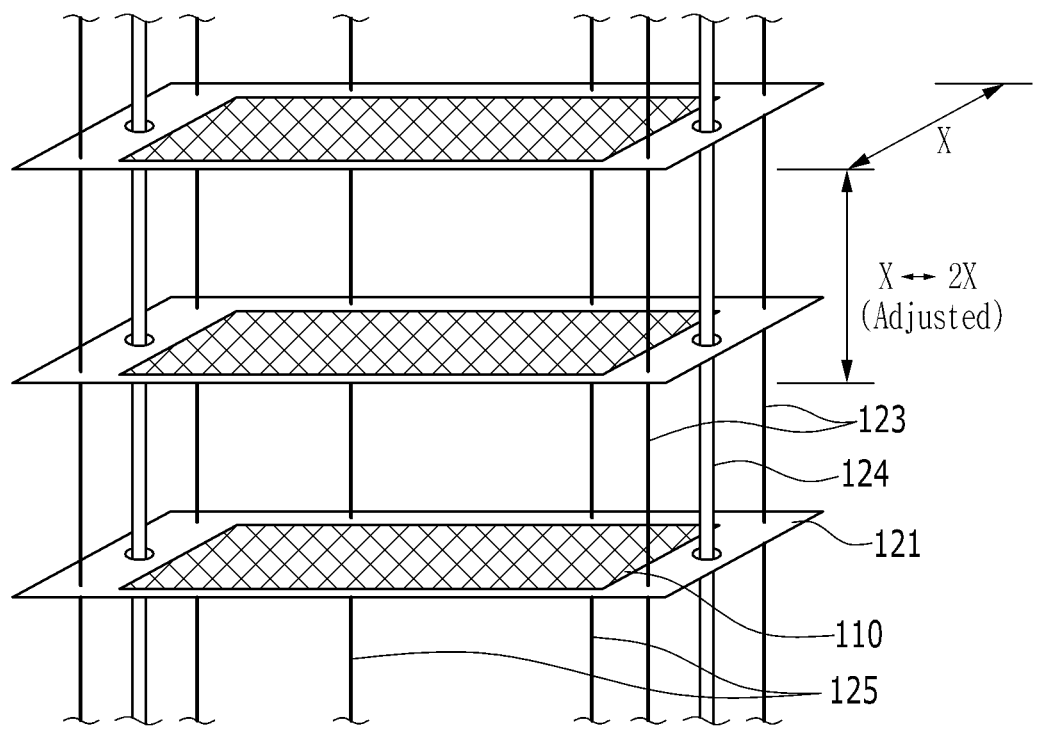
FIG. 3 is an enlarged view of the sunshade for power generation of FIG. 2 according to the first exemplary embodiment

FIG. 3 is an enlarged view of the sunshade for power generation of FIG. 2 according to the first exemplary embodiment.

Referring to FIG. 3, the sunshade 121 for power generation shown in FIG. 2 according to the first exemplary embodiment may have a distance of a predetermined multiple (e.g., two times) of a width X of the sunshade from an adjacent sunshade 121.

The driver 130 adjusts the inclination angle of the sunshades and the distance between the sunshades through the angle adjustment strap 123, the opening/closing adjustment strap 124, and the distance adjustment strap 125, each connected with each sunshade 121 for power generation. For example, the driver 130 may adjust a distance between the sunshades to be constantly one to two times (X↔2X) the width X of the sunshade through the distance adjustment strap 125.

In FIG. 3, two distance adjustment straps 125 are symmetrically provided with reference to a center of the sunshade 121. Here, the distance adjustment straps 125 are provided to adjust a distance between sunshades, and the number of the distance adjustment straps and the locations of the distance adjustment straps may be changed. Accordingly, the number and the locations of the distance adjustment straps 125 are not limited.

Figure 4:
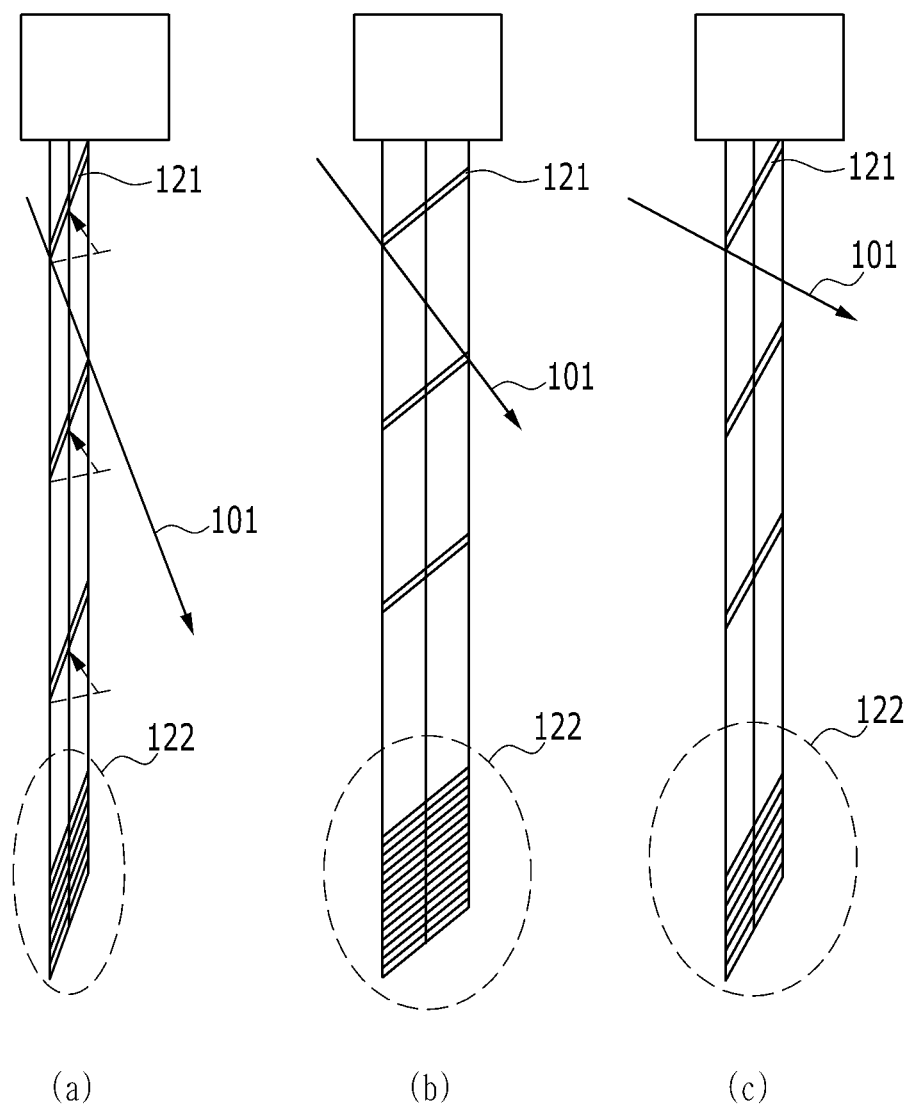
FIG. 4 is an example illustrating an inclination angle of sunshades, a length of the sunshade, and a degree of direct sunlight according to a seasonal culmination altitude according to the first exemplary embodiment.

FIG. 4 is an example illustrating an inclination angle of a sunshade, a length of the sunshade, and a degree of direct sunlight according to a seasonal culmination altitude according to the first exemplary embodiment.

FIG. 4 shows inclination angles of the sunshades 121 for power generation according to the seasonal meridian altitude. Here, when a latitude is 37°, a distance between the sunshades 121 for power generation is set to two times the width of the sunshade. That is, the sunshades 122 for privacy protection, to which the solar module 110 is not attached, are disposed adjacent to each other at a lower end of the tracking-type window blind apparatus 100.

As shown in FIG. 4 (*a*), when a culmination altitude (the summer solstice) is 75.50°, that is, when an inclination angle of sunlight 101 is 75.50°, the controller 140 may control an inclination angle of the sunshades 121 for power generation to be 74.45°.

As shown in FIG. 4 (*b*), when a culmination altitude (vernal equinox or autumnal equinox) is 52.47°, that is, when an inclination angle of the sunlight 101 is 52.47°, the controller 140 may control an inclination angle of the sunshades 121 for power generation to be 37.53°. Here, the inclination angle of the sunshades 121 for power generation is adjusted to be an inclination angle that is perpendicular to the sunlight.

As shown in FIG. 4 (*c*), when a culmination altitude (the winter solstice) is 28.59°, that is, when an inclination angle of the sunlight 101 is 28.59°, the controller 140 may control an inclination angle of the sunshades 121 for power generation to be 61.41°. Here, the inclination angle of the sunshade 121 for power generation is adjusted to be an inclination angle that is perpendicular to the sunlight.

The culmination altitude per seasonal divisions minutely varies seasonally with each season. Thus, an inclination angle of a seasonal culmination altitude (e.g., the summer solstice, vernal equinox, autumnal equinox, or the winter solstice) may be applied differently every year rather than being limited to a specific inclination angle.

Figure 5:
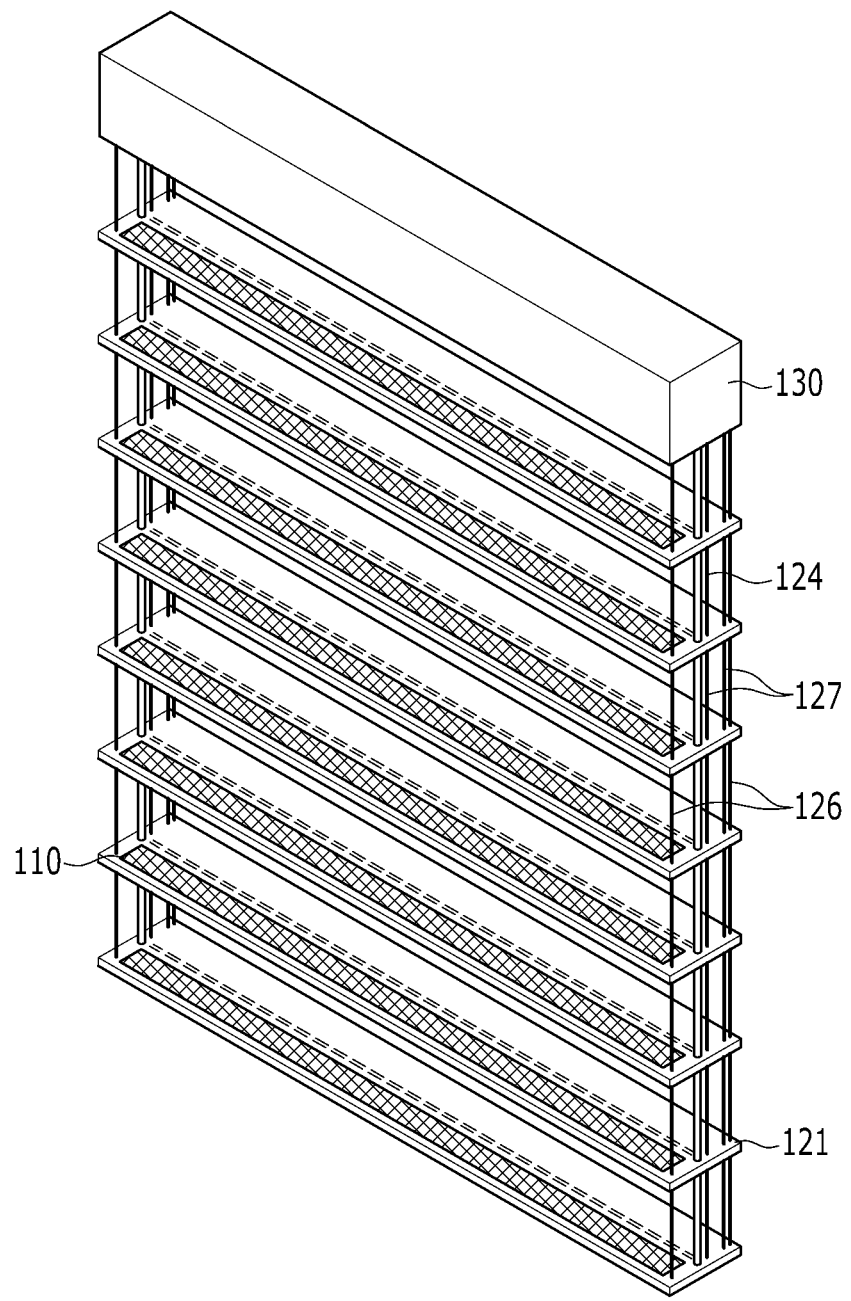
FIG. 5 is a diagram illustrating a tracking-type window blind apparatus that is equipped with sunshades for power generation, wherein each sunshade is divided into a first region and a second region, according to a second exemplary embodiment.

FIG. 5 is a diagram illustrating a tracking-type window blind apparatus that is equipped with sunshades for power generation, wherein each sunshade is divided into a first region and a second region, according to a second exemplary embodiment.

As shown in FIG. 5, in a tracking-type window blind apparatus according to the second exemplary embodiment, each sunshade 121 for power generation is divided into a first region to which a solar module 110 is attached and a second region to which the solar module 110 is not attached.

For example, when a ratio between the first region and the second region is 50:50, the solar module 110 may be attached to only a half an area of the sunshade 121 for power generation, which corresponds to an area that is not shaded (i.e., a portion close to a window). Thus, the sunshade to which the solar module 110 is attached can be structurally simply provided in the tracking-type window blind apparatus 100.

Here, the driver 130 individually rotates the first region and the second region of each sunshade 121 for power generation with reference to a rotation axis that is disposed between the first region and the second region.

For example, the driver 130 may include a first driving module that simultaneously rotates the first region and the second region and a second driving module that individually rotates only the second region.

Alternatively, the driver 130 may include a first driving module that rotates only the first region and a second driving module that rotates only the second region.

Since the tracking-type window blind apparatus 100 can allow direct sunlight to be entered or blocked by second angle adjustment straps 127 that adjust an inclination angle of the second region where the solar module 110 is not attached. Problem of lighting and blocking direct sunlight, which is caused due to an insufficiently wide distance between the sunshades 121, can be solved.

The controller 140 individually controls an inclination angle of the first region and the second region of the sunshade 121 for power generation according to a predetermined operation mode, a current season and time, and a comparison result between a solar altitude angle and a predetermined altitude angle, to thereby introduce or block direct sunlight.

Figure 6:
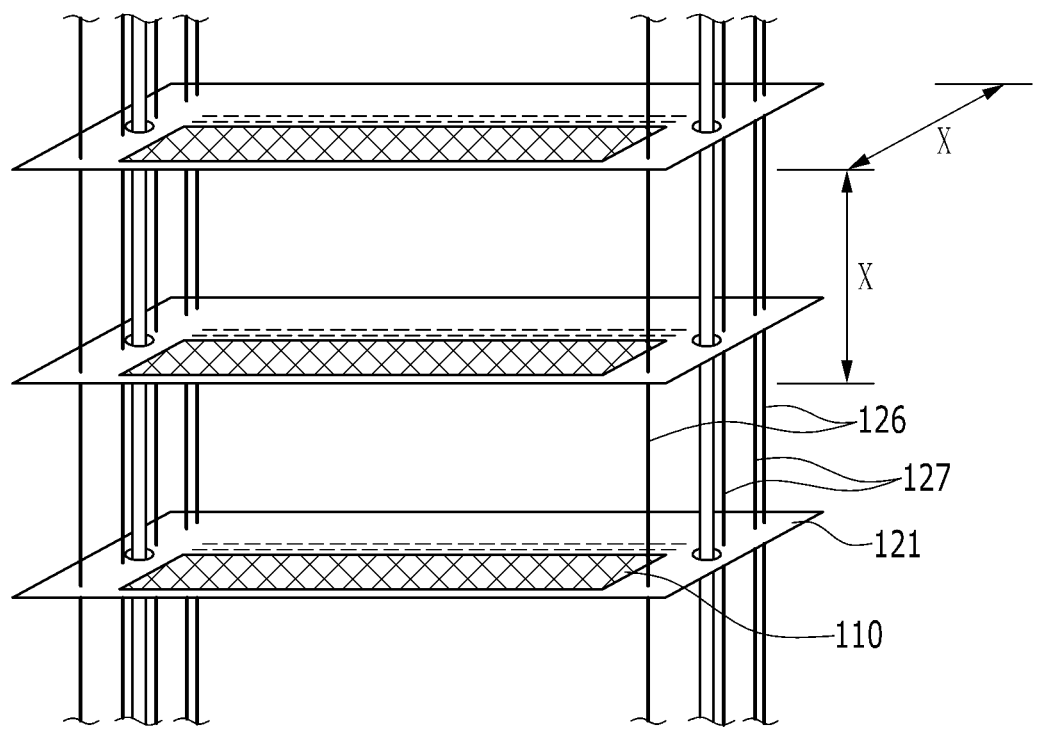
FIG. 6 and FIG. 7 are enlarged views illustrating a first angle adjustment strap and a second angle adjustment strap shown in FIG. 5 according to the second exemplary embodiment.
Figure 7:
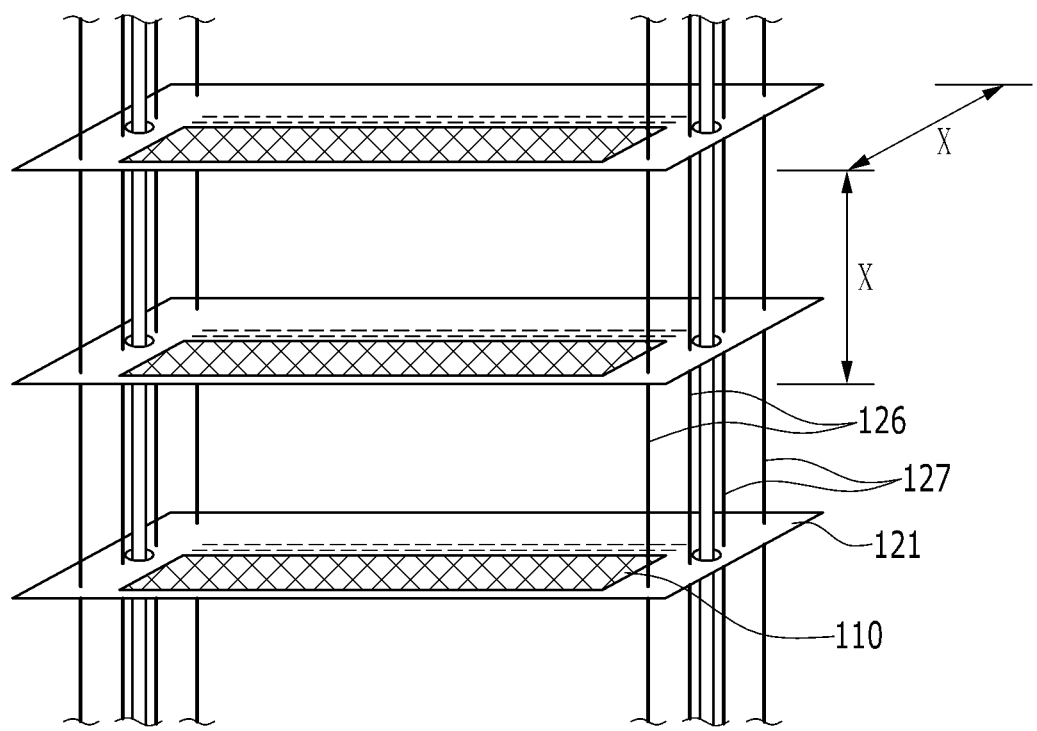

FIG. 6 and FIG. 7 are enlarged views illustrating the first and second angle adjustment straps shown in FIG. 5 according to the second exemplary embodiment.

The angle adjustment straps 126 and 127, which are shown in FIG. 5 according to the second exemplary embodiment, may be separated into first angle adjustment straps 126 and second adjustment straps 127.

As shown in FIG. 6, the first angle adjustment straps 126 are connected to a left end and a right end of each sunshade 121. The first angle adjustment straps 126 are used to simultaneously rotate the first region and the second region of the sunshade 121.

In addition, the second angle adjustment straps 127 are connected to a spot that corresponds to the second region of each sunshade 121. That is, the second angle adjustment straps 127 are disposed between the opening/closing adjustment strap 124 and the right end of each sunshade 121. The second angle adjustment strap 127 is used to rotate only the second region.

FIG. 7 shows another example of the angle adjustment straps of FIG. 5.

As shown in FIG. 7, the first angle adjustment straps 126 are connected to spots that correspond to first regions of the respective sunshades. That is, the first angle adjustment straps 126 are connected between the left ends of the sunshades 121 and the opening/closing adjustment strap 124. The first angle adjustment strap 126 is used to independently rotate the first region of each sunshade.

In addition, the second angle adjustment straps 127 are connected to spots that correspond to second regions of the sunshades 121. That is, the second angle adjustment straps 127 are connected between the opening/closing adjustment strap 124 and the right end of the sunshade 121. The second adjustment strap 127 is used to independently rotate only the second region.

Figure 8:
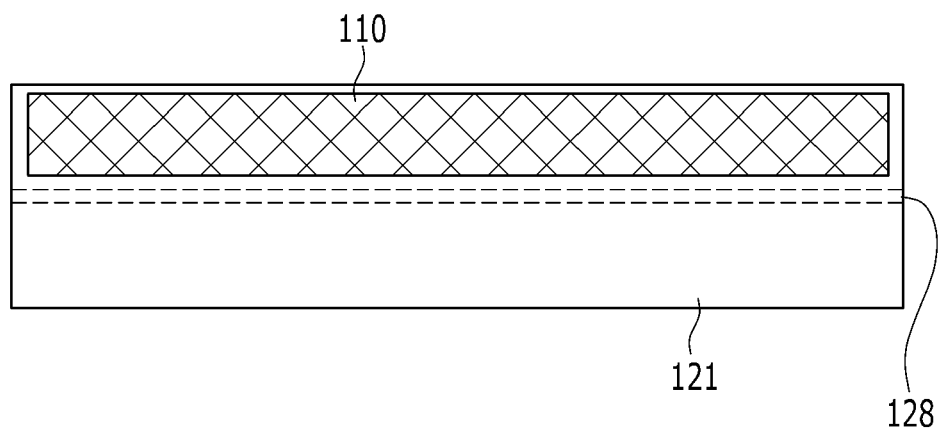
FIG. 8 is an enlarged view illustrating the sunshades divided into the first region and the second region of FIG. 5 according to the second exemplary embodiment.
Figure 8:
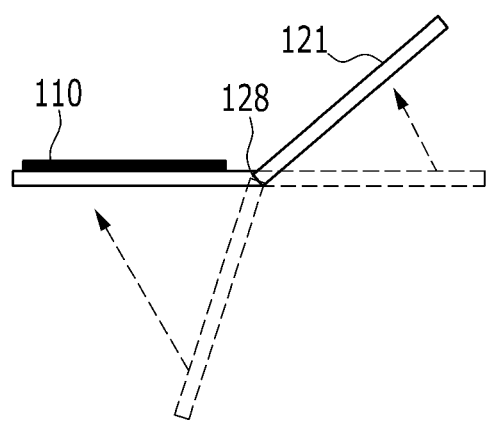

FIG. 8 is an enlarged view illustrating the sunshades divided into the first region and the second region of FIG. 5 according to the second exemplary embodiment.

The sunshade 121 for power generation, divided into the first region and the second region, have a simple structure and can be easily manufactured, and the solar module 110 can be attached to only a part of the entire region, thereby increasing economic feasibility.

The tracking-type window blind apparatus 100 having the sunshades 121 for power generation, which are divided into the first region and the second region according to the second exemplary embodiment, automatically controls a distance between the sunshades 121 and an angle of the sunshades 121 based on seasons and time.

The tracking-type window blind apparatus 100 according to the second exemplary embodiment calculates an actual operation value depending on an operation mode by using a program, and controls an inclination angle of each of the first and second regions.

For example, a distance between the sunshades 121 for power generation is one time the width of the sunshade 121. It is possible to control sunlight to be directly entered or blocked without using the sunshades 122 for privacy protection according to the first exemplary embodiment.

As shown in FIG. 8, the solar module 110 is attached to only about half of each sunshade 121 for power generation. The driver 130 adjusts an angle of sunshade in each of the first region and second region to satisfy one of operation modes among a privacy protection mode and a lighting mode depending on circumstances.

The sunshades 121 for power generation is folded at a portion, that is, a rotation shaft 128, which is provided between the first region and the second region. Thus the controller 140 can control the driver 130 to determine an inclination angle of the sunshade, and introduce or block direct sunlight depending on a solar altitude angle.

Next, the driver 120 adjusts an inclination angle of the first region and an inclination angle of the second region through angle adjustment straps 126 and 127 that are connected with the plurality of sunshades 121.

Figure 9:
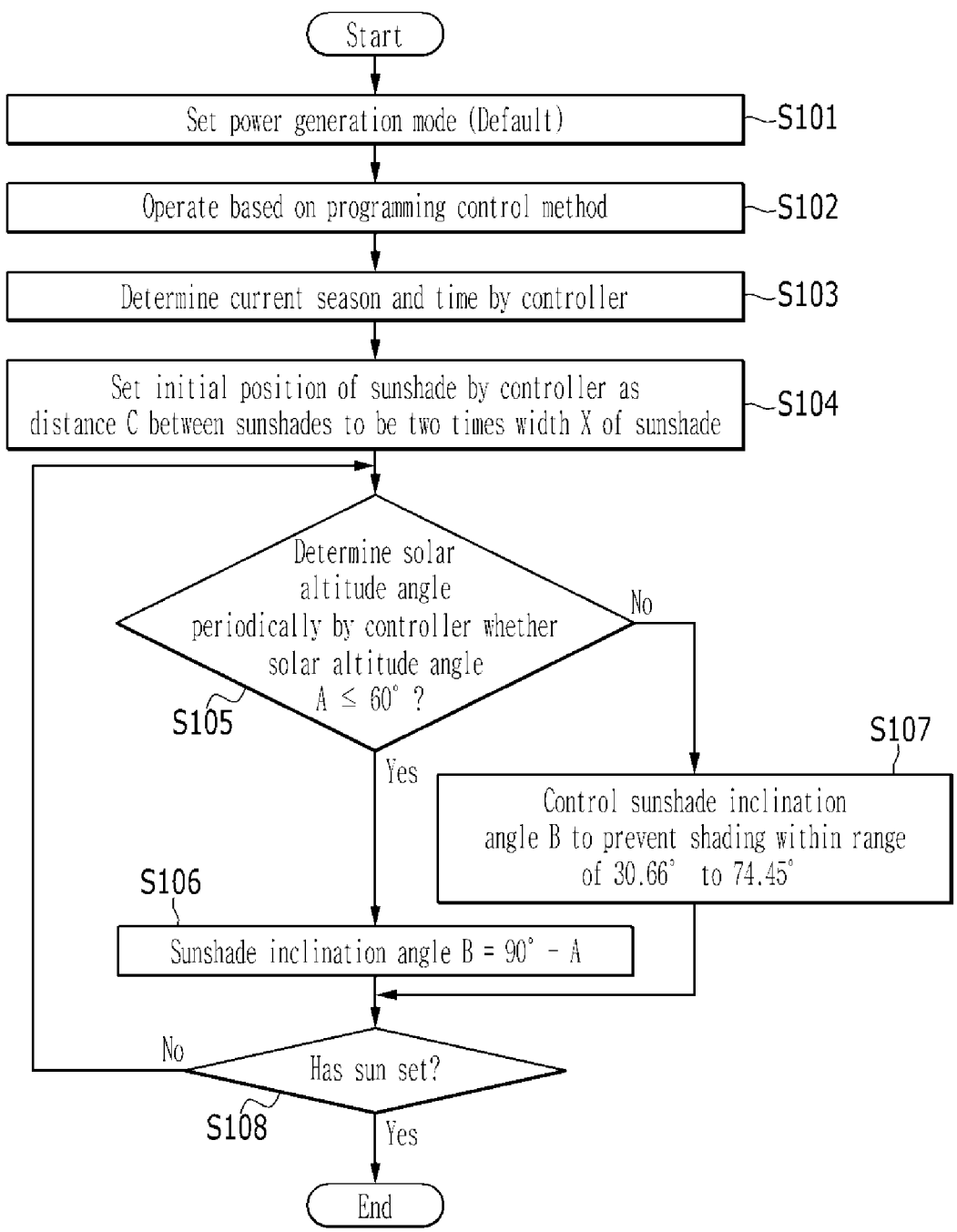
FIG. 9 is a flowchart illustrating an operation method of the tracking-type window blind apparatus in the general power generation mode according to the first exemplary embodiment.

FIG. 9 is a flowchart illustrating an operation method of the tracking-type window blind apparatus in the general power generation mode according to the first exemplary embodiment.

In the general power generation mode, the tracking-type window blind apparatus 100 controls the driver 130 for maximizing a power generation with a default value that focuses on the power generation amount in consideration of season, time, and weather.

Hereinafter, the operation method of the tracking-type window blind apparatus 100 in the power generation mode will be described with reference to FIG. 9.

The tracking-type window blind apparatus 100 sets an operation mode to a power generation mode according to a user command (S101). The generation mode is set as a default in the first exemplary embodiment.

The tracking-type window blind apparatus 100 is set to operate based on a programming control method (S102).

The controller 140 of the tracking-type window blind apparatus 100 determines a current season and time (S103).

The controller 140 of the tracking-type window blind apparatus 100 sets an initial position of sunshades, and sets a distance C between the sunshades to two times a width X of the sunshade (S104).

The controller 140 of the tracking-type window blind apparatus 100 determines a solar altitude angle periodically, and determines whether a determined solar altitude angle A is smaller than a predetermined altitude angle (e.g., 60°) (S105).

As a result of the determination in S105, when the solar altitude angle A is smaller than 60°, the controller 140 controls an inclination angle B of the sunshades to be perpendicular to the solar altitude angle, that is, (90°−A)

(S106). Here, in general, a solar term (solar calendar) corresponds to September 4 to April 9.

On the other hand, when the solar altitude angle A exceeds 60° as a result of the determination in S105, the controller 140 controls the inclination angle B of the sunshade to prevent shading (S107). For example, the controller 140 may control the inclination angle of the sunshades B within a range of 30.66° to 74.45°. Here, in general, a solar term (solar calendar) corresponds to April 10 to September 3 and the time corresponds to 10 a.m. (or 11 a.m. depending on solar terms) to 2 p.m. (or 1 p.m. depending or solar terms).

Next, the tracking-type window blind apparatus 100 determines whether the sun has set (S108).

As a result of the determination in S108, when the sun has not set, the tracking-type window blind apparatus 100 repeats the process from S105 for determination of the solar altitude angle.

On the other hand, when the sun has set as a result of the determination in S108, the tracking-type window blind apparatus 100 terminates the generation mode in the tracking-type window blind apparatus 100 using the solar modules 110.

Figure 10A:
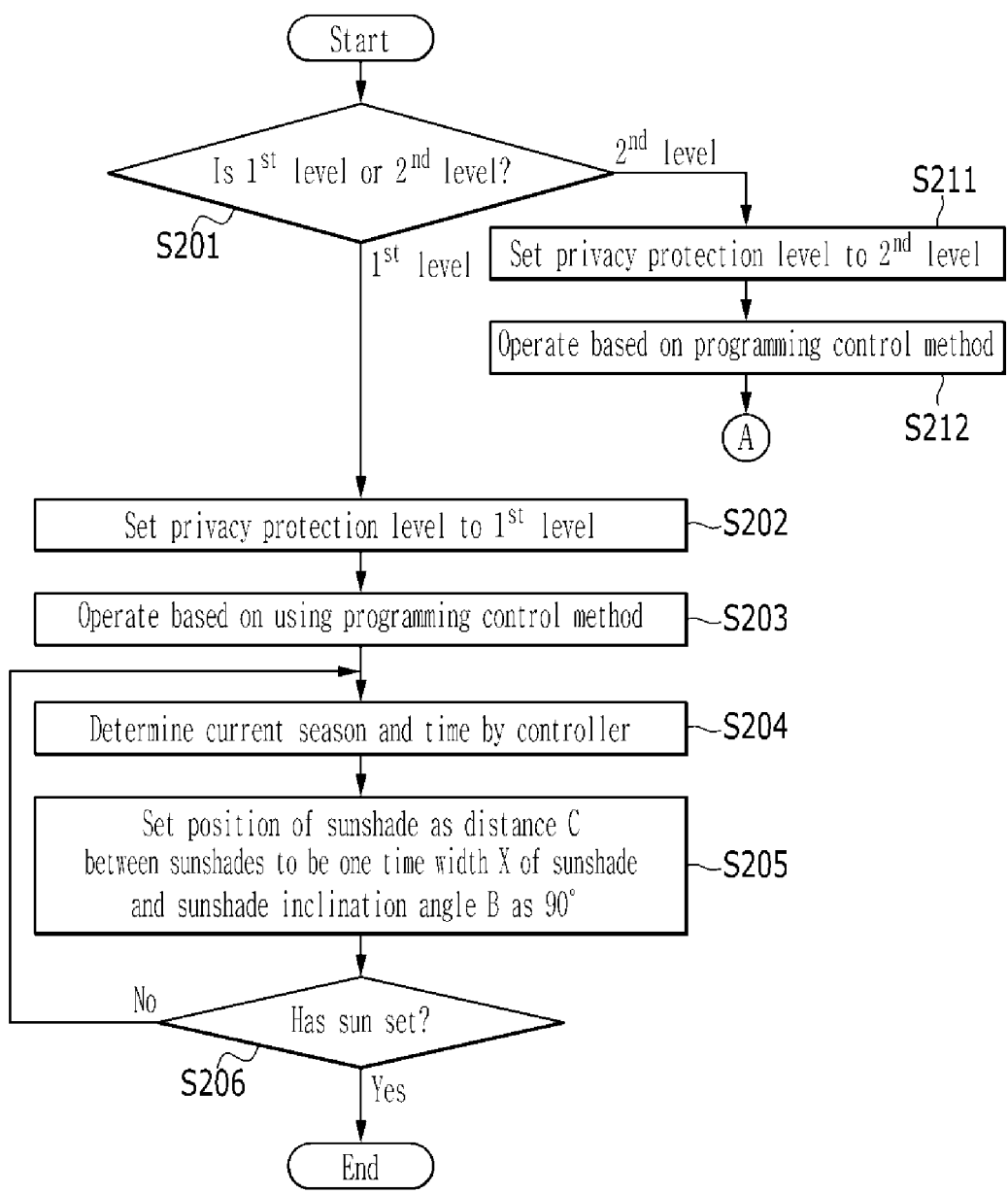
FIG. 10 is a flowchart illustrating an operation method of the tracking-type window blind apparatus in the privacy protection mode according to the first exemplary embodiment.
Figure 10B:
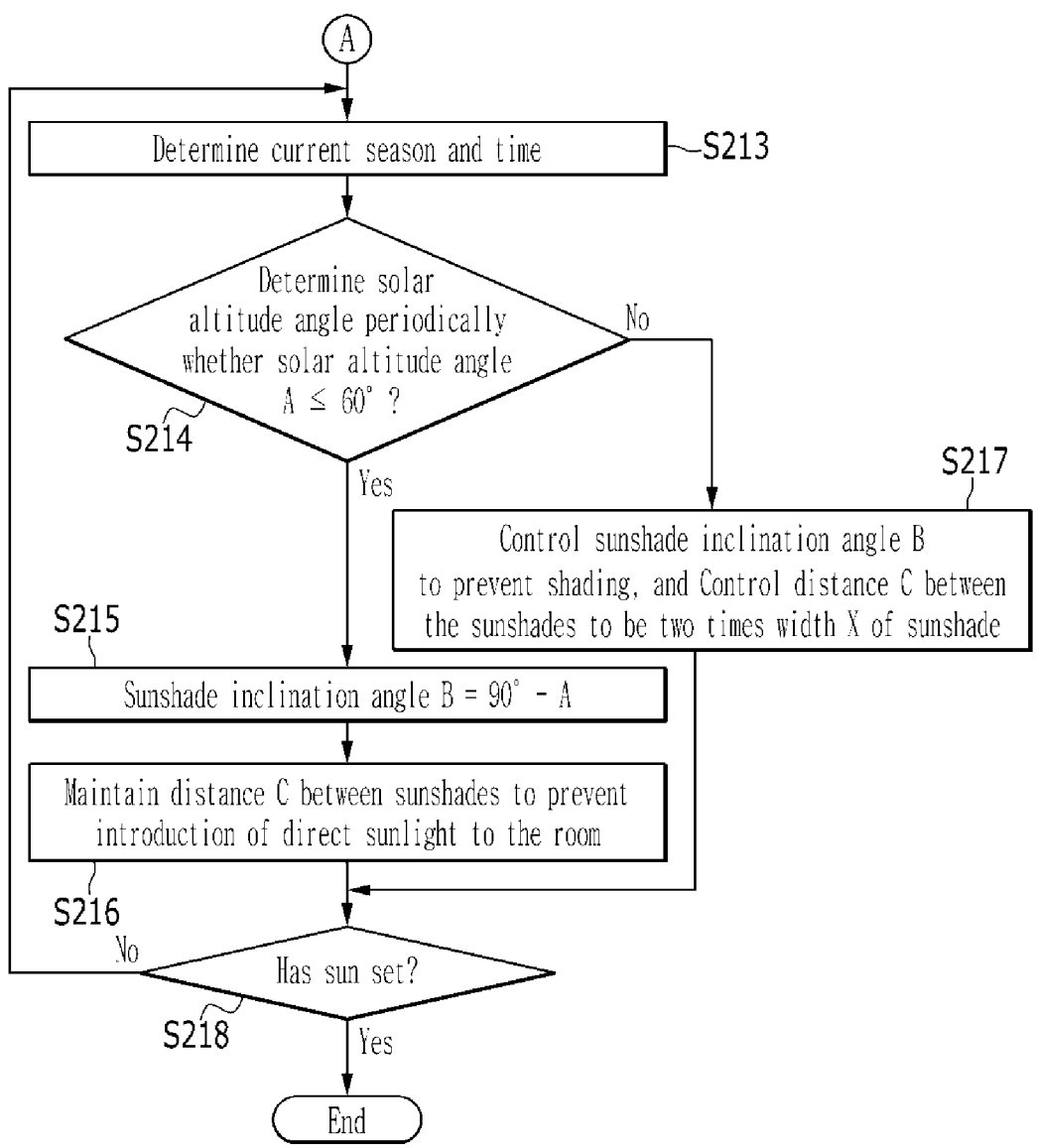

FIG. 10 is a flowchart illustrating an operation method of the tracking-type window blind apparatus in the privacy protection mode according to the first exemplary embodiment.

In the privacy protection mode, the tracking-type window blind apparatus 100 protects privacy differently according to a level.

For example, the privacy protection levels may be classified into a first level and a second level.

In case of the first level of the privacy protection, the tracking-type window blind apparatus 100 controls an inclination angle of the sunshades and a distance between the sunshades to be a completely closed or shielded state by the driver 130. That is, the tracking-type window blind apparatus 100 controls the inclination angle of the sunshades for power generation and the inclination angle of the sunshades for privacy protection to a vertical direction and controls the distance between the sunshades to one time the width of the sunshade.

When the privacy protection level is the second level, the tracking-type window blind apparatus 100 blocks direct sunlight regardless of season using the power generation sunshades, while controlling a distance and an angle of the sunshades to prevent adjacent sunshades from being shaded. The tracking-type window blind apparatus 100 can control indoor brightness through adjustment of the distance and angle of the sunshades and achieve privacy protection through shielding of the sunshades.

Hereinafter, the operation method of the tracking-type window blind apparatus 100 in the privacy protection mode will be described with reference to FIG. 10.

The tracking-type window blind apparatus 100 receives the first level or the second level of the privacy protection mode according to a user's command (S201).

When the first level is selected in S201, the window blind apparatus 100 sets a level of the privacy protection mode to the first level (S202).

The tracking-type window blind apparatus 100 is set to operate based on a programming control method (S203).

The controller 140 of the tracking-type window blind apparatus 100 determines the current season and time (S204).

The controller 140 of the tracking-type window blind apparatus 100 sets a position of the sunshades such that the distance C between the sunshades to be one time the width X of the sunshade and the inclination angle of the sunshades B to be 90° (S205).

Next, the tracking-type window blind apparatus 100 determines whether the sun has set (S206).

If the sun has not set as a result of the determination in S206, the tracking-type window blind apparatus 100 repeats the process from S204, which is the process for determination of the current season and time.

On the other hand, if the sun has set as a result of the determination in S206, the tracking-type window blind apparatus 100 terminates the privacy protection mode in the tracking-type window blind apparatus 100 using the solar modules 110.

Meanwhile, when the second privacy protection level is selected in S201, the tracking-type window blind apparatus 100 sets the privacy protection level to the second level (S211).

The tracking-type window blind apparatus 100 is set to operate based on the programming control method (S212).

The controller 140 of the tracking-type window blind apparatus 100 determines the current season and time (S213).

The controller 140 of the tracking-type window blind apparatus 100 determines a solar altitude angle periodically, and determines whether a determined solar altitude angle A is smaller than 60° (S214).

When the solar altitude angle A is smaller than 60° in S214, the controller 140 controls the inclination angle of the sunshades B to an angle (90°−A) that becomes perpendicular to the solar altitude angle (S215).

Next, the controller 140 maintains a distance C between the sunshades to prevent the introduction of direct sunlight to the room (S216).

Meanwhile, when the solar altitude angle A exceeds 60° as a result of the determination in S214, the controller 140 controls the inclination angle of the sunshade to prevent shading in the sunshades, and controls the distance C between the sunshades to be two times the width X of the sunshade (S217). Here, a range B of the inclination angle of the sunshades, which can prevent shading in the sunshades, may be 30.66° to 74.45°.

Next, the tracking-type window blind apparatus 100 determines whether the sun has set (S218).

If the sun has not set as a result of the determination in S218, the tracking-type window blind apparatus 100 repeats the process from S213, which is the process for determination of the current season and time.

On the other hand, if the sun has set as a result of the determination in S218, the tracking-type window blind apparatus 100 terminates the privacy protection mode in the tracking-type window blind apparatus 100 using the solar modules 110.

Figure 11:
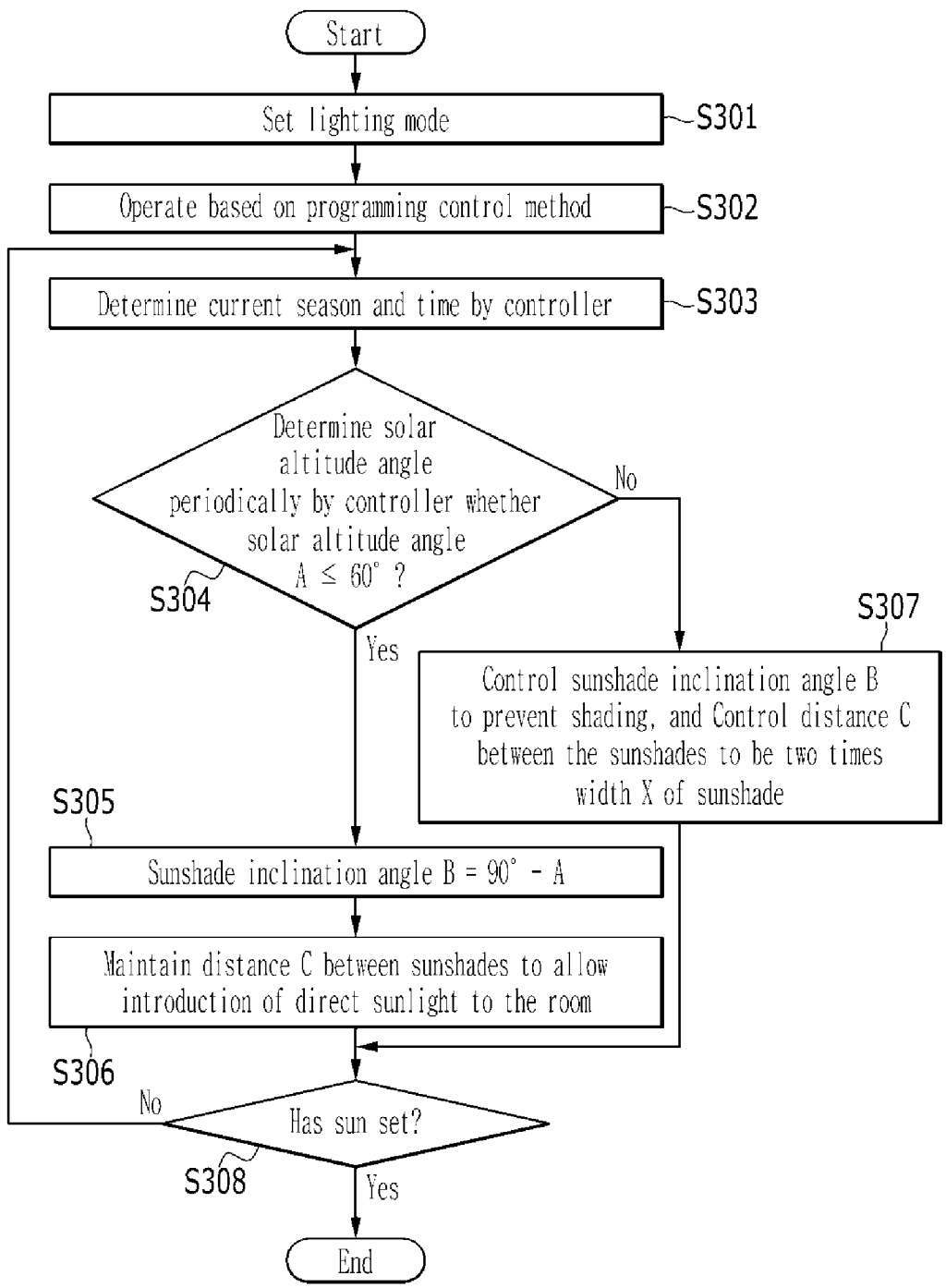
FIG. 11 is a flowchart illustrating an operation method of the tracking-type window blind apparatus in the lighting mode according to the first exemplary embodiment.

FIG. 11 is a flowchart illustrating an operation method of the tracking-type window blind apparatus in the lighting mode according to the first exemplary embodiment.

In the lighting mode, the tracking-type window blind apparatus 100 determines a degree of introduction of direct sunlight. Here, the lighting mode may be called a direct sunlight mode.

In the lighting mode, the tracking-type window blind apparatus 100 controls the driver 130 for proper introduction of direct sunlight to the room while preventing the sunshades from being shaded by adjusting sunshades per season.

Hereinafter, an operation method of the tracking-type window blind apparatus 100 in the lighting mode will be described with reference to FIG. 11.

The tracking-type window blind apparatus 100 sets an operation mode to the lighting mode according to a user's command (S301).

The tracking-type window blind apparatus 100 is set to operate based on the programming control method (S302).

The controller 140 of the tracking-type window blind apparatus 100 determines the current season and time (S303).

The controller 140 of the tracking-type window blind apparatus 100 determines a solar altitude angle periodically, and determines whether a determined solar altitude angle A is smaller than 60° (S304).

When the solar altitude angle A is smaller than 60° and the solar altitude angle A is smaller and S304, the controller 140 controls the inclination angle of the sunshades B to an angle (90°−A) that becomes perpendicular to the solar altitude angle (S305).

Next, the controller 140 maintains a distance C between the sunshades to allow the introduction of direct sunlight to the room (S306).

Meanwhile, when the solar altitude angle A exceeds 60° as a result of the determination in S304, the controller 140 controls the inclination of the sunshade to prevent shading in the sunshades, and controls the distance C between the sunshades to be two times the width X of the sunshade (S307).

Next, the tracking-type window blind apparatus 100 determines whether the sun has set (S308).

If the sun has not set as a result of the determination in S308, the tracking-type window blind apparatus 100 repeats the process from S303, which is the process for determination of the current season and time.

On the other hand, if the sun has set as a result of the determination in S308, the tracking-type window blind apparatus 100 terminates the privacy protection mode in the tracking-type window blind apparatus 100 using the solar modules 110.

Figure 12A:
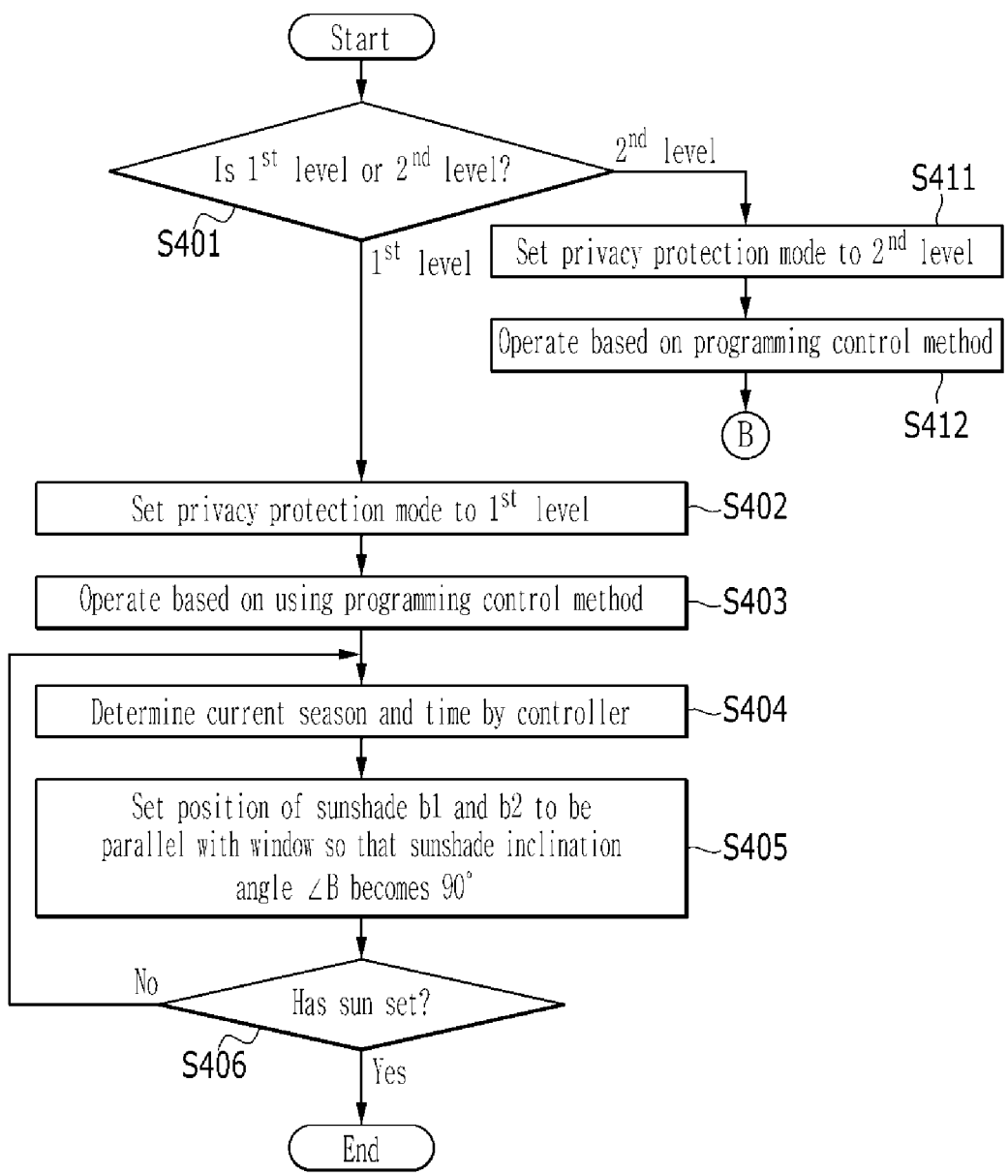
FIG. 12A and FIG. 12B are flowcharts illustrating an operation method of the tracking-type window blind apparatus in the lighting mode according to the first exemplary embodiment.
Figure 12B:
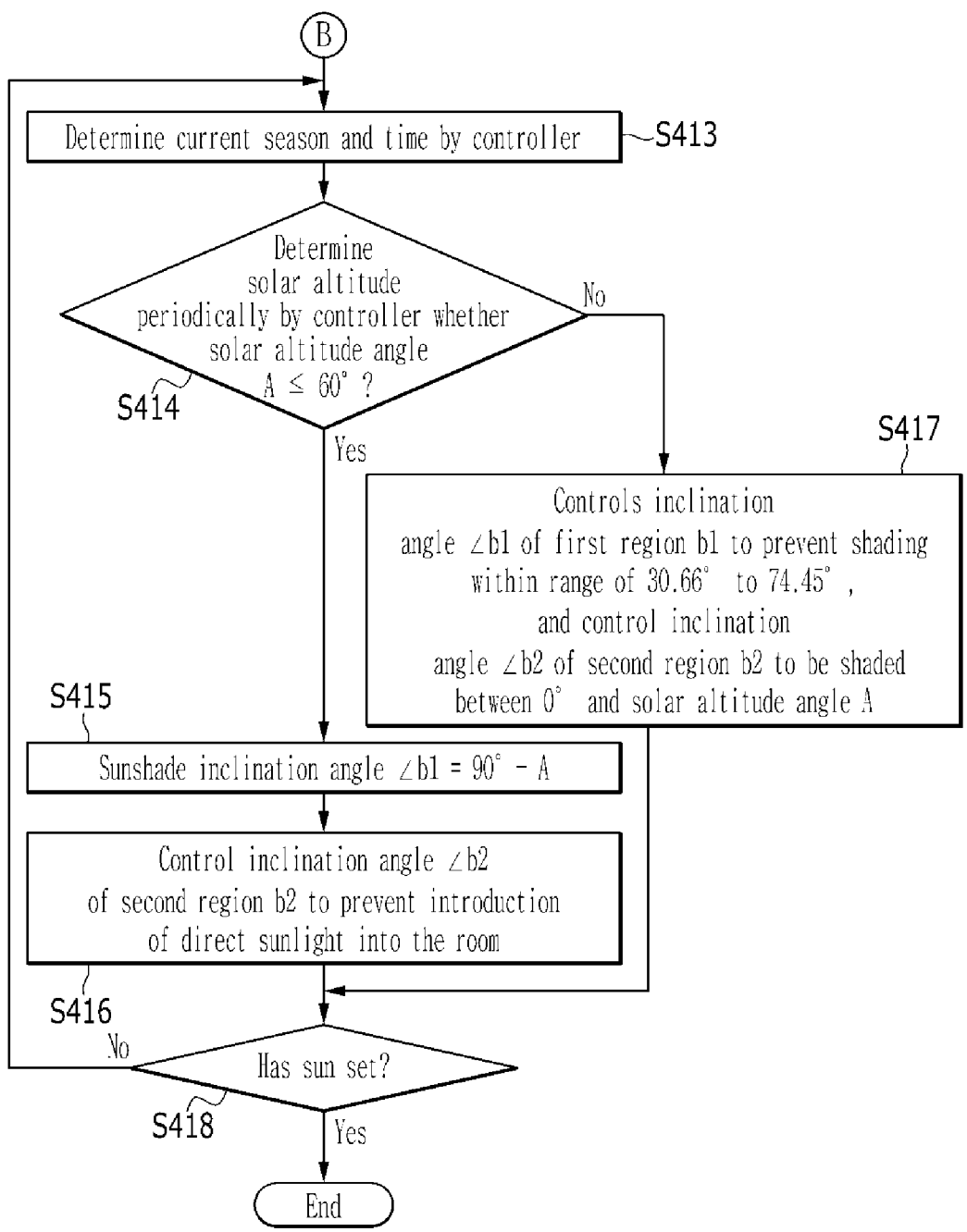
Figure 12C:
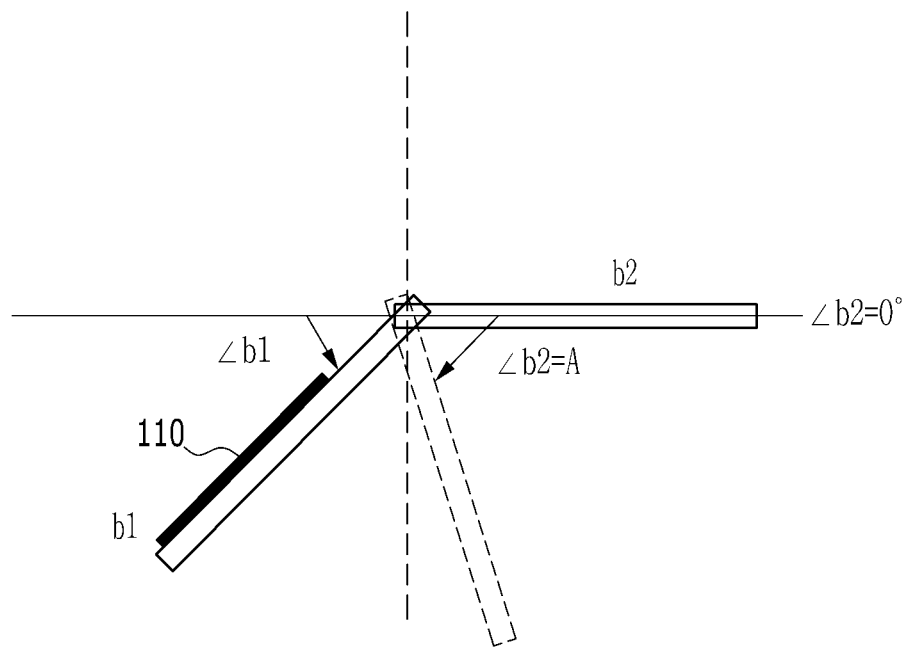
FIG. 12C is an example illustrating operation of the sunshade, which is divided into a first region and a second region in a privacy protection mode, according to the second exemplary embodiment.

FIG. 12A and FIG. 12B are flowcharts illustrating an operation method of the tracking-type window blind apparatus in the lighting mode according to the first exemplary embodiment. FIG. 12C is an example illustrating operation of the sunshade, which is divided into a first region and a second region in a privacy protection mode according to the second exemplary embodiment.

First, as shown in FIG. 12C, sunshade according to the second exemplary embodiment are divided into a first region b1 and a second region b2. When the first region b1 of the sunshade is horizontal, an inclination angle of the first region b1 becomes 0°. The first region b1 have an inclination angle of ∠b1 depending on an angle of rotation with reference to a horizontal state. In addition, when the second region b2 of the sunshade is horizontal, the inclination angle of the second region b2 becomes 0°. The second region b2 have an inclination angle of ∠b2 depending on an angle of rotation with reference to a horizontal state.

In the privacy protection mode, the tracking-type window blind apparatus 100 protects privacy by setting a difference according to a level. For example, the privacy protection levels may be divided into a first level and a second level (default).

Hereinafter, referring to FIG. 12A to FIG. 12C, an operation method of the tracking-type window blind apparatus in the privacy protection mode according to the second exemplary embodiment will be described.

The tracking-type window blind apparatus 100 receives the first level or the second level (default) of the privacy protection mode according to a user's command (S401). Here, the second level of privacy protection mode is set as a default in the second exemplary embodiment.

When the first level is selected in S401, the tracking-type window blind apparatus 100 sets a level of the privacy protection mode to the first level (S402).

The tracking-type window blind apparatus 100 is set to operate based on a programming control method (S403).

The controller 140 of the tracking-type window blind apparatus 100 determines the current season and time (S404).

The controller 140 of the tracking-type window blind apparatus 100 sets a position of the sunshade as the inclination angle of the sunshades ∠B to be 90° (S405). That is, the first region b1 and the second region b2 of the sunshade become parallel with a glass window that is disposed in a vertical direction.

Next, the tracking-type window blind apparatus 100 determines whether the sun has set (S406).

If the sun has not set as a result of the determination in S406, the tracking-type window blind apparatus 100 repeats the process from S404, which is the process for determination of the current season and time.

On the other hand, if the sun has set as a result of the determination in S406, the tracking-type window blind apparatus 100 terminates the privacy protection mode in the tracking-type window blind apparatus 100 using the solar modules 110.

Meanwhile, when the second privacy protection level, which is a default, is selected in S401, the tracking-type window blind apparatus 100 sets the privacy protection level to the second level (S411).

The tracking-type window blind apparatus 100 is set to operate based on the programming control method (S412).

The controller 140 of the tracking-type window blind apparatus 100 determines the current season and time (S413).

The controller 140 of the tracking-type window blind apparatus 100 determines a solar altitude angle at periodically, and determines whether a determined solar altitude angle A is smaller than 60° (S414).

When the solar altitude angle A is smaller than 60° as a result of the determination in S414, the controller 140 controls the inclination angle ∠b1 of the first region b1 to an angle (90°−A) that becomes perpendicular to the solar altitude angle (S415).

In addition, the controller 140 controls the inclination angle ∠b2 of the second region b2 to prevent the introduction of direct sunlight into the room (S416).

Meanwhile, when the solar altitude angle A exceeds 60° as a result of the determination in S414, the controller 140 controls the inclination angle ∠b1 of the first region b1 to prevent shading, while adjusting the inclination angle ∠b2 of the second region b2 to be shaded (S417). Here, a range of the inclination angle ∠b1 of the first region b1, which can prevent shading in the first region b1, may be 30.66° to 74.45°. In addition, the inclination angle ∠b2 of the second region b2 may be between 0° and the solar altitude angle A.

Next, the tracking-type window blind apparatus 100 determines whether the sun has set (S418).

If the sun has not set as a result of the determination in S418, the tracking-type window blind apparatus 100 repeats the process from S413, which is the process for determination of the current season and time.

On the other hand, if the sun has set as a result of the determination in S418, the tracking-type window blind apparatus 100 terminates the privacy protection mode in the tracking-type window blind apparatus 100 using the solar modules 110.

Figure 13A:
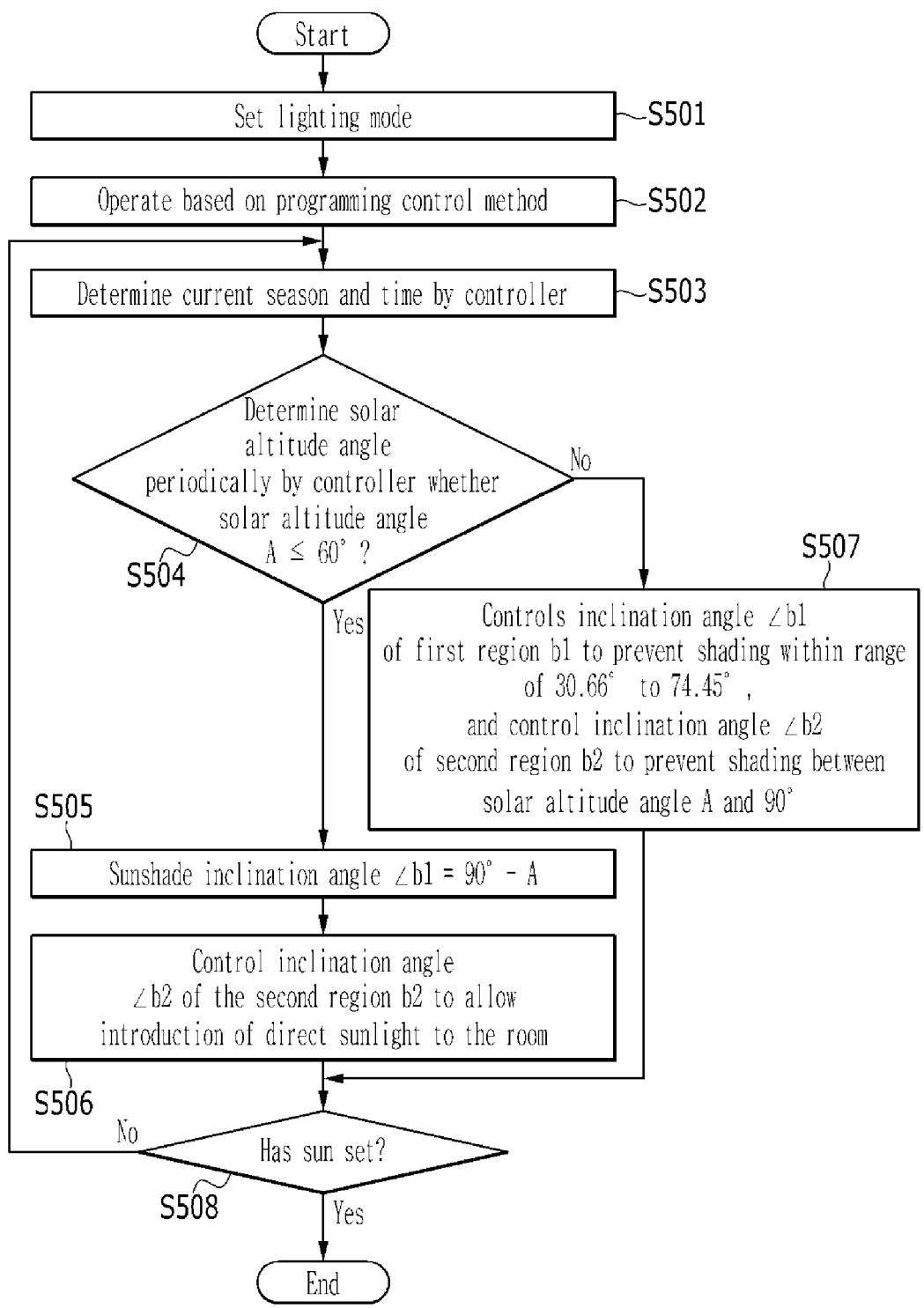
FIG. 13A is a flowchart illustrating an operation method of the tracking-type window blind apparatus in a lighting and direct sunlight mode according to the second exemplary embodiment.
Figure 13B:
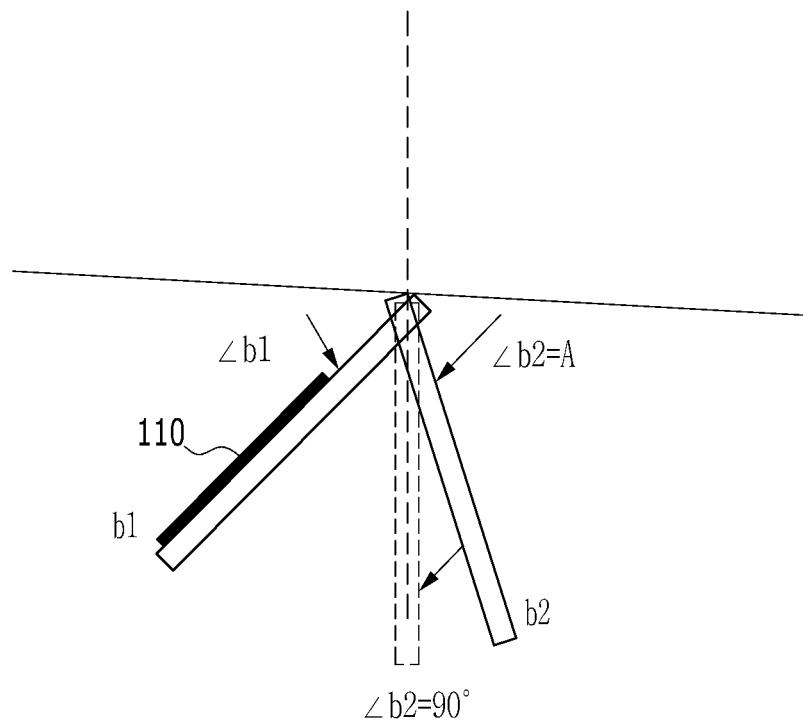
FIG. 13B is an example illustrating operation of sunshades, which are divided into a first region and a second region in the lighting and direct sunlight mode according to the second exemplary embodiment.

FIG. 13A is a flowchart illustrating an operation method of the tracking-type window blind apparatus in a lighting and direct sunlight mode according to the second exemplary embodiment. FIG. 13B is an example illustrating operation of sunshades, which are divided into a first region and a second region in the lighting and direct sunlight mode according to the second exemplary embodiment.

First, as shown in FIG. 13B, sunshades according to the second exemplary embodiment are divided into a first region b1 and a second region b2. The first region b1 of sunshade has an inclination angle of 0° when being horizontal, and has an inclination angle ∠b1 depending on a rotation angle with reference to the horizontal state. In addition, the second region b2 of the sunshade has an inclination angle of 0° when being horizontal, and has an inclination angle ∠b2 depending on a rotation angle with reference to the horizontal state. When the second region b2 is a perpendicular state, the inclination angle ∠b2 becomes 90°.

Hereinafter, referring to FIG. 13A and FIG. 13B, an operation method of the tracking-type window blind apparatus in the lighting and direct sunlight mode according to the second exemplary embodiment will be described.

The tracking-type window blind apparatus 100 sets an operation mode as a lighting mode according to a user's command (S501).

The tracking-type window blind apparatus 100 is set to operate based on the programming control method (S502).

The controller 140 of the tracking-type window blind apparatus 100 determines the current season and time (S503).

The controller 140 of the tracking-type window blind apparatus 100 determines a solar altitude angle periodically, and determines whether a determined solar altitude angle A is smaller than 60° (S504).

When the solar altitude angle A is smaller than 60° as a result of the determination in S504, the controller 140 controls the inclination angle ∠b1 of the sunshade to an angle (90°−A) that becomes perpendicular to the solar altitude angle (S505).

In addition, the controller 140 controls the inclination angle ∠b2 of the second region b2 to allow the introduction of direct sunlight to the room (S506).

When the solar altitude angle A exceeds 60° as a result of the determination in S504, the controller 140 controls the inclination angle ∠b1 of the first region b1 to prevent shading in the first region b1, and controls the inclination angle ∠b2 of the second region b2 to prevent shading in the second region b2 of the sunshade (S507). Here, a range of the inclination angle ∠b1, which can prevent the first region b1 of the sunshade from being shaded may be between 30.66° and 74.45°. In addition, a range of the inclination angle ∠b2, which can prevent the second region b2 of the sunshade from being shaded may be between the solar altitude angle A and 90°.

Next, the tracking-type window blind apparatus 100 determines whether the sun has set (S508).

If the sun has not set as a result of the determination in S508, the tracking-type window blind apparatus 100 repeats the process from S503, which is the process for determination of the current season and time.

On the other hand, if the sun has set as a result of the determination in S508, the tracking-type window blind apparatus 100 terminates the privacy protection mode in the tracking-type window blind apparatus 100 using the solar modules 110.

Meanwhile, the tracking-type window blind apparatus 100 according to an exemplary embodiment may operate in a non-power generation mode.

In the non-power generation mode, the tracking-type window blind apparatus 100 may operate by a remote controller rather than based on a program by manually or automatically setting a degree of shielding based on a user's intuition.

A user manually sets a degree of shielding by using sunshades for achieving desired purposes, such as viewing and privacy protection in the privacy protection mode.

Here, in the non-power generation mode, the tracking-type window blind apparatus 100 recognizes a time or season predetermined by a user and then can be automatically switched to an operation mode set in the non-power generation mode.

Figure 14:
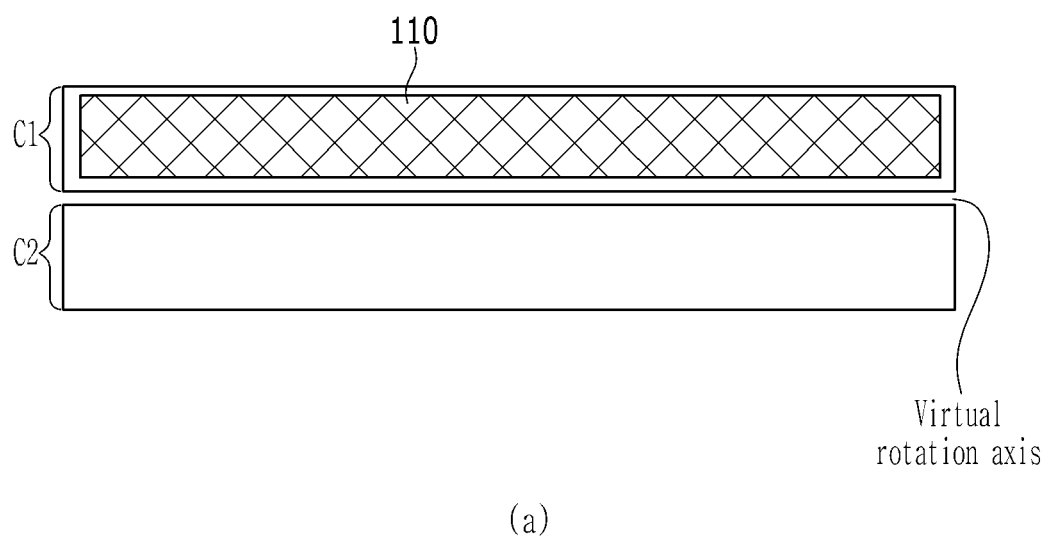
FIG. 14 is an enlarged view illustrating a sunshade divided into a first region and a second region according to a third exemplary embodiment.
Figure 14:
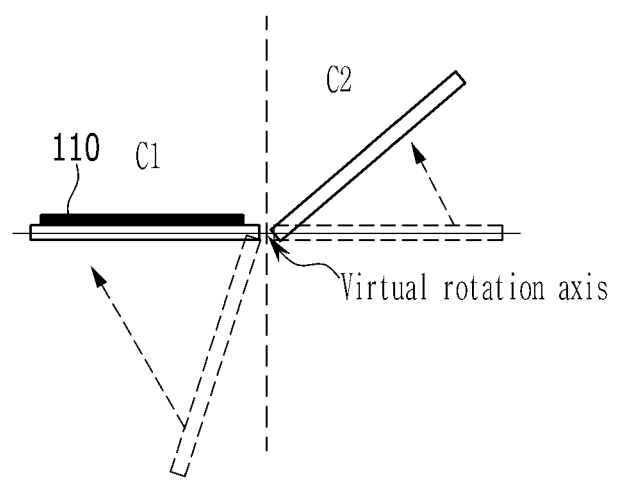

FIG. 14 is an enlarged view illustrating a sunshade divided into a first region and a second region according to a third exemplary embodiment.

As shown in FIG. 14, a plurality of sunshades according to the third exemplary embodiment respectively consist of first regions c1 where solar module 110 is attached and second regions c2 where the solar module 110 is not attached. The first region c1 and the second region c2 of the sunshade rotate with respect to a virtual rotation axis, which is formed between the first region c1 and the second region c2 of the sunshade. Here, the virtual rotation axis becomes a reference for operation of the first region c1 and the second region c2 as like a single body. That is, although the first region c1 and the second region c2 of each sunshade are separated from each other, the first region c1 and the second region c2 of the sunshade rotate as if the rotation axis is present between the first region c1 and the second region c2 of the sunshade. Such a virtual rotation axis is formed at a spot where an end of the first region c1 and an end of the second region c2 meet each other.

The plurality of sunshades according to the third exemplary embodiment may have a lesser limit in the selection of a material and design in the view of simplicity in manufacturing. The first region c1 and the second region c2 of the sunshade may be respectively made of different materials. In addition, since the first region c1 and the second region c2 of the sunshade are separated from each other with respect to the vertical rotation axis, there is no limit on the radius of rotation in which the first region c1 and the second region of the sunshade are rotated. Since the first region c1 and the second region c2 of the sunshade individually operate, the lifespan can be increased. For example, the first region c1 and the second region c2 of the sunshade may be distanced apart from each other by a gap of about 1 mm. In such a case, they can rotate without interfering with a rotation radius of each other, and there are few restrictions on production, design, and material selection, which can be advantageous in terms of lifespan, manufacturing cost, and simplicity of the process.

Meanwhile, the tracking-type window blind apparatus according to the exemplary embodiment may have interoperability and competitiveness as shown in Table 1. Economic feasibility means cost-effectiveness.

TABLE 1

| | Customer satisfaction and utilization of green building | Power generation index | Area of view (necessary for viewing) | | Economic feasibility |
| --- | --- | --- | --- | --- | --- |
| | | | Landscape function | Indoor temperature control function | |
| Electric blind | Δ | — | 1 | Δ | Δ |
| Conventional blind-type photovoltaic device | x | 80~90 | 1 or less | x | x |
| Tracking-type window blind apparatus according to the present disclosure | o | 120 | Spring/Fall: about 2.4 times<br>Summer: about 0.5~2.7 times<br>Winter: over 4.38 times<br>Four seasons: over 2.7 times | Spring/Fall: optimum heat<br>Summer: cool<br>Winter: warm<br>Four seasons: optimum heat | o |

In table 1, "Power generation index" is a power generation index per solar cell area, and is based on a fixed type (south side, inclination angle of 30 degrees) of power generation index of 100.

According to the power generation index, the present disclosure is improved by 120% in a power generation amount compared to the fixed type in which a shading problem in a conventional art is first solved.

According to the Landscape function, the present disclosure provides 0.5 times viewing capability in summer by setting shading (shielding) to the maximum to reduce an indoor temperature to the maximum, and thus the viewing capability can be set to 2.7 times at maximum for the purpose of viewing even during solar power generation.

According to the Landscape function, the present disclosure provides an important factor in winter for increasing competitiveness in the tracking-type window blind apparatus since space heating accounts for 55% of the energy consumption in residential buildings and "electronic and electronic equipment including air conditioners" account for 10% of energy consumption. In winter, when the tracking-type window blind apparatus is provided indoors, the tracking-type window blind apparatus lets sunlight enter indoors such that a sufficient amount of solar radiation can be assured, and heat of the room is maintained by the blind and heat generated in the solar power generation can be obtained in the first region b1 to which the solar module 110 is attached. That is, in addition to allowing the solar radiation to enter the space between the windows and blinds, the blinds reflect in the room and the heat generated by the solar power increases the room temperature, thus reducing energy (heating load) required for heating.

Figure 15:
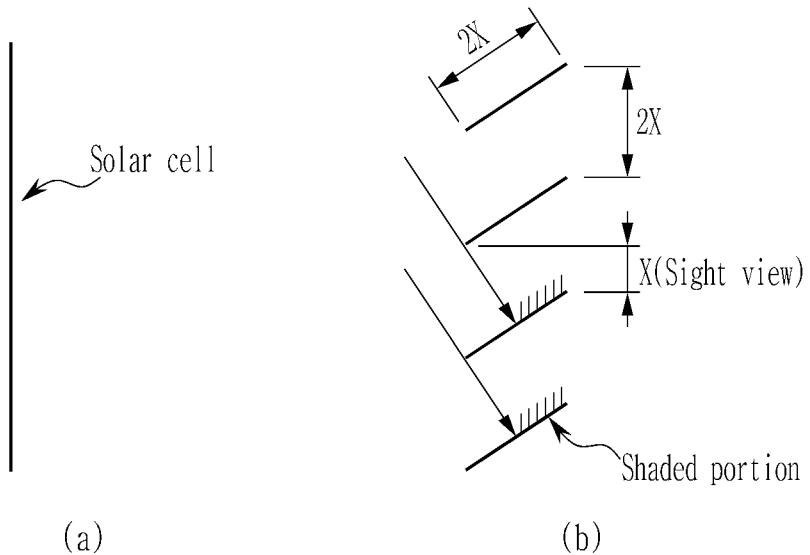
FIG. 15 shows the comparison of power generation ratio by type of PV system.
Figure 15:
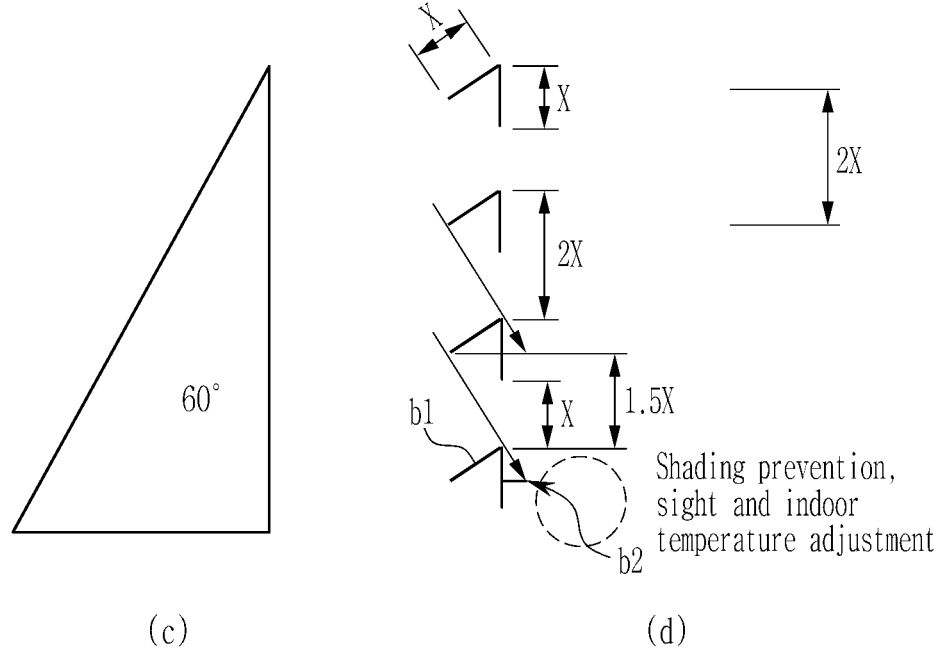

FIG. 15 shows the comparison of power generation ratios by type of PV system.

First, a referential power generation index is based on 100 in case of a fixed type (south side, inclination angle of 30°).

A wall-mounted photovoltaic device shown in FIG. 15 (a) has a power generation amount of about 68%.

A conventional blind-type photovoltaic device shown in FIG. 15 (b) has a power generation amount of about 80% to about 90%. In the conventional blind-type photovoltaic device, a viewing field of about a distance X is generated when a width of a sunshade is 2x. In addition, the sunshade is partially shaded due to an adjacent sunshade.

A veranda-installed mini solar-type photovoltaic device shown in FIG. 15 (c) has a power generation amount of about 92%.

The tracking-type window blind apparatus according to the exemplary embodiment, shown in FIG. 15 (d) has a power generation amount of about 120%. In the tracking-type window blind apparatus, a sunshade is divided into a first region b1 where the solar module 110 is attached and a second region b2 where the solar module 110 is not attached. In the tracking-type window blind apparatus according to the present disclosure, when the first region b1 and the second region b2 of the sunshade each has a width of X, a viewing field of about up to a 1.5x distance can be assured. In addition, adjacent sunshades do not cause shading. The second region b2 to which the solar module 110 is not attached serves functions such as shading prevention, viewing control, indoor temperature control, lighting control, and the like.

As described, the tracking-type window blind apparatus according to the exemplary embodiment has a power generation amount of about 174 compared to the wall-mounted type, 140 compared to the conventional blind type, about 130 compared to the veranda-installed mini solar type, and about 120 compared to the fixed type.

Figure 16:
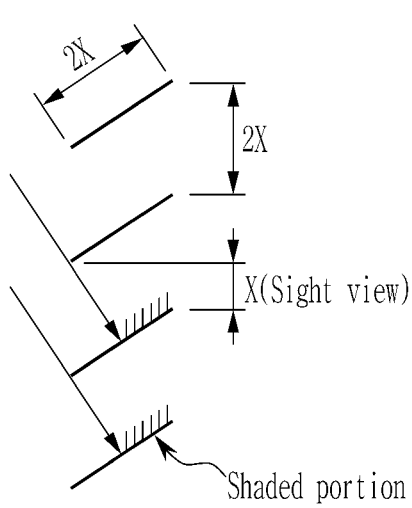
FIG. 16 shows the comparison of viewing and room temperature control capability between the conventional blind-type photovoltaic device and the tracking-type window blind apparatus according to the exemplary embodiment.
Figure 16:
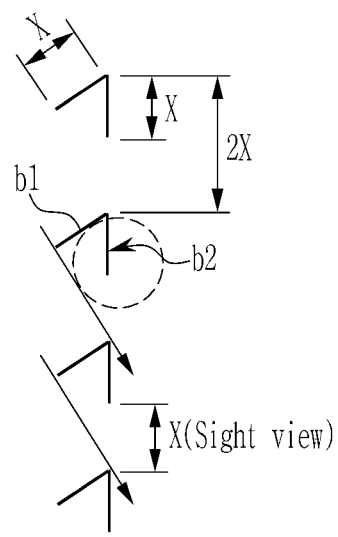
Figure 16:
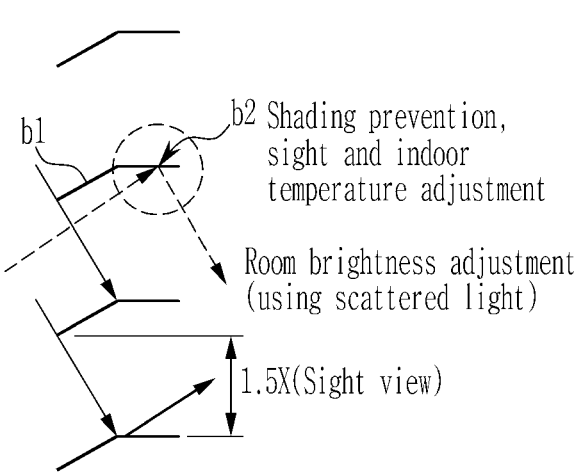
Figure 16:
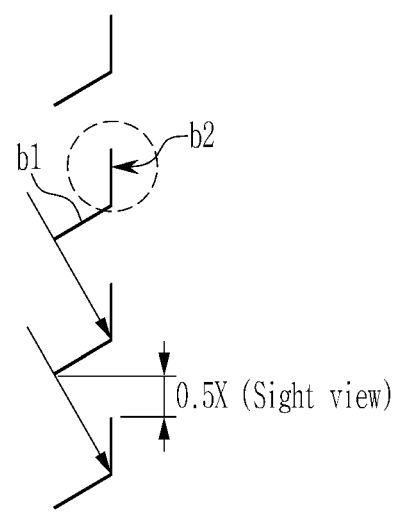

FIG. 16 shows the comparison of viewing and room temperature control capability between the conventional blind-type photovoltaic device and the tracking-type window blind apparatus according to the exemplary embodiment.

As shown in FIG. 16 (a), in the conventional blind-type photovoltaic device, a distance between adjacent sun shading slats is 2x. In such a case, the viewing field has a view of as much as X, and the slat may be partially shaded.

Meanwhile, when the second region b2 of the sunshade of the tracking-type window blind apparatus is horizontal, the inclination angle becomes 0°, and the second region b2 has an inclination angle of ∠b2 depending on a rotation angle of the second region b2 with reference to a horizontal state.

As shown in FIG. 16 (b), for the lighting, the inclination angle ∠b2 of the second region b2 of the sunshade is 90°.

As shown in FIG. 16 (c), for the viewing and the lighting, the inclination angle ∠b2 of the second region b2 of the sunshade is 0°.

As shown in FIG. 16 (d), for the shielding, the inclination angle ∠b2 of the second region b2 of the sunshade is −90°.

As described, the tracking-type window blind apparatus according to the exemplary embodiment can automatically select lighting and shielding by using a part of the sunshade or the remote control by the user, and accordingly, a room temperature can be optimally controlled.

Meanwhile, Table 2 shows the comparison of the view of four seasons and room temperature control capability (viewing angle).

TABLE 2

| Sight view per device | Slat inclination angle | | | | | |
|---|---|---|---|---|---|---|
| | 0° | 30° | 45° | 60° | 90° | Average |
| Viewable view of Conventional blind-type PV device = ① | 0.50 | 0.29 | .13 | — | — | |
| Viewable view of Tracking-type window blind apparatus according to the present disclosure = ② | 0.75 | 0.65 | .57 | — | — | |
| Percentage of sight required to view according to the present disclosure = ②/① | 1.50 times | 2.24 times | over 4.38 times | — | | Over 2.7 times |

Here, a viewable view is set so that sunshine and lighting are maximized when the inclination angle ∠b2 of the second region of the sunshade is 0° (∠b2=0°).

In Table 2, according to the Conventional blind-type PV device, the Viewable view at 60° is 0.13 that a solar altitude angle is low in winter and thus an inclination angle ∠b1 of the slat is set to be over 60° in sunlight generation so that a view is very poor.

The percentage of sight required to view according to the present disclosure is over 4.38 times at 60° that a viewing angle (amount of sunshine and lighting) required for sunshine and a view in winter can be effectively assured, and since space heating accounts for 55% of the energy consumption in residential buildings, competitiveness of the tracking-type window blind apparatus according to the present disclosure can be enhanced.

The tracked window blind apparatus according to the present disclosure can provide a good view and lighting during four seasons, and thus can optimize the room temperature control regardless of solar power generation. When the inclination angle of the sunshades ∠b2 of the second region is 0° (∠b2=0°), an area around a latitude of 36° (Cheongju, Republic of Korea) having four distinct seasons was applied.

Meanwhile, Table 3 shows the comparison of a view and indoor temperature control capability (viewing angle) in summer according to a type of a PV device.

TABLE 3

| Sight view per device | Slat inclination angle | | | | | |
|---|---|---|---|---|---|---|
| | 0° | 30° | 45° | 60° | 90° | Average |
| Viewable view of Conventional blind-type PV device = ① | 0.50 | 0.29 | 0.13 | — | | |
| Viewable view of Tracking-type window blind apparatus according to the present disclosure = ② | 0.06 | 0.15 | 0.07 | — | | |
| Percentage of sight required to view according to the present disclosure = ②/① | 0.14 times | 0.52 times | 0.54 times | | | about 0.4 times |

Here, a viewable view is set so that sunshine and lighting are minimized when the inclination angle ∠b2 of the second region of the sunshade is -90° (∠b2=-90°).

In Table 3, the percentage of sight required to view according to the present disclosure is about 0.4 times on average that since it is summer, narrower viewing angles mean that direct sunlight and scattered light are not introduced into the room, and accordingly, it is advantageous for proper room temperature control (cool state maintenance).

When the inclination angle of the sunshades ∠b2 of the second region b2 is set to -90°, not only direct sunlight but also unnecessary scattered light in summer can be blocked, thereby enhancing the effect of lowering the room temperature and the sensible temperature. Thus, in a time zone near a slat inclination angle ∠b1 of 60° time inclination angle of the second region b2 is changed to 90e and thus the viewing capability can be improved by increasing a viewing angle ratio from 0.07 to 0.5, while blocking almost all direct sunlight.

Meanwhile, Table 4 shows the comparison of a view and indoor temperature control capability (viewing angle) in spring and fall according to a type of a PV device.

TABLE 4

| Sight view per device | Slat inclination angle | | | | | |
|---|---|---|---|---|---|---|
| | 0° | 30° | 45° | 60° | 90° | Average |
| Viewable view of Conventional blind-type PV device = ① | 0.50 | 0.29 | 0.13 | — | | |
| Viewable view of Tracking-type window blind apparatus according to the present disclosure = ② | 0.5 | 0.5 | 0.5 | — | | |
| Percentage of sight required to view according to the present disclosure = ②/① | 1 times | 0.72 times | 3.86 times | | | about 2.2 times |

Here, a viewable view is set so that sunshine and lighting are properly maintained when the inclination angle ∠b2 of the second region of the sunshade is 90°.

When the inclination angle ∠b2 of the second region b2 is set to 90°, direct sunlight in spring and autumn is blocked, while allowing necessary scattered light to enter the room properly, and accordingly, the room temperature, the view, and the illumination can be kept in the optimal condition. However, when the slat inclination angle ∠b2 of the second region b2 is changed to 0° according to a user's preference and environment (i.e., room temperature, a user optimum temperature, a view, and light), a viewing angle ratio is increased from 2.2 times to 2.7 times such that viewing capability can be improved while increasing a room temperature. However, in such a case, an amount of direct sunlight introduced to the room is hardly changed and an amount of scattered light introduced into the room is increased. Accordingly, a user needs to properly select a slat inclination angle ∠b1.

Meanwhile, Table 5 shows the comparison of a view and indoor temperature control capability (viewing angle) in winter according to a type of a PV device.

TABLE 5

| Sight view per device | Slat inclination angle | | | | | |
|---|---|---|---|---|---|---|
| | 0° | 30° | 45° | 60° | 90° | Average |
| Viewable view of Conventional blind-type PV device = ① | — | | | 0.13 | | — |
| Viewable view of Tracking-type window blind apparatus according to the present disclosure = ② | — | | | 0.57 | | — |

TABLE 5-continued

| Sight view per device | Slat inclination angle | | | | | |
|---|---|---|---|---|---|---|
| | 0° | 30° | 45° | 60° | 90° | Average |
| Percentage of sight required to view according to the present disclosure = ②/① | — | | Over 4.38 times | | about over 4.4 times | |

Here, a viewable view is set so that sunshine and lighting are properly maintained when the inclination angle ∠b2 of the second region of the sunshade is 0°

When the inclination angle ∠b2 of the second region b2 is set to 0°, direct sunlight in winter can be partially blocked, while allowing necessary scattered light to enter the room as much as possible. Thus, a necessary amount of sunshine in winter can be assured, thereby keeping the room temperature, view, and illumination at the optimum conditions.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, the exemplary embodiments disclosed in the present disclosure are intended not to limit but to describe the technical spirit, and the range of the technical spirit is not limited by the exemplary embodiment. The scope shall be construed on the basis of the accompanying claims in such a manner that all of the technical ideas included within the scope equivalent to the claims belong to the present disclosure.

The invention claimed is:

1. A blind apparatus using solar modules, comprising:
a plurality of sunshades to adjust an amount of incoming sunlight;
a plurality of solar modules, each of which is attached to a first region of a respective one of the plurality of sunshades and generating power by using solar light;
a driver which is connected with the plurality of sunshades, and is configured to adjust an inclination angle of each sunshade and a distance between the sunshades; and
a controller which is configured to control the inclination angle of each sunshade and the distance between the sunshades according to a current season of year and a present time of day, and a solar altitude angle,
wherein each of the plurality of sunshades comprises a rotation axis that divides each of the plurality of sunshades into the first region to which the solar module is attached and a second region to which no solar module is attached, and wherein at least one of the first region and the second region is configured to rotate with respect to the rotation axis such that an angle between the first region and the second region is changed, and
wherein the controller is configured to independently control an inclination angle of at least one of the first region and the second region to allow or block entering of sunlight.

2. The window blind apparatus of claim 1, further comprising:
at least one sunshade to which no solar module is attached.

3. A window blind apparatus using solar modules, comprising:
a plurality of sunshades configured to adjust an amount of incoming sunlight;
a plurality of solar modules, each of which is attached to a first region of a respective one of one of the plurality of sunshades and generating power by using solar light;
a driver which is connected with the plurality of sunshades, and is configured to adjust an inclination angle of each sunshade and an interval between adjacent sunshades; and
a controller which is configured to control the inclination angle of each sunshade and the interval between the adjacent sunshades according to a current season of year, a present time of day, and a solar altitude angle,
wherein each of the plurality of sunshades comprises the first region to which one of the solar modules is attached and a second region to which no solar module is attached, the first region is separate from the second region, at least one rotational axis exists between the first region and the second region, and at least one of the first region and the second region is configured to rotate with respect to the at least one rotation axis such that an angle between the first region and the second region is changed, and
wherein the controller is further configured to independently control an inclination angle of at least one of the first region and the second region to allow or block entering of sunlight.

4. The window blind apparatus of claim 3, further comprising:
at least one sunshade which is not equipped with a solar module.

5. A window blind apparatus using solar modules, comprising:
a plurality of sunshades configured to adjust an amount of incoming sunlight;
a plurality of solar modules, each of which is attached to a first region of a respective one of one of the plurality of sunshades and generating power by using solar light;
a driver which is connected with the plurality of sunshades, and is configured to adjust an inclination angle of each sunshade and an interval between adjacent sunshades; and
a controller which is configured to control the inclination angle of each sunshade and the interval between the adjacent sunshades according to a current season of year, a present time of day, and a solar altitude angle,
wherein each of the plurality of sunshades comprises the first region to which one of the solar modules is attached and a second region to which no solar module is attached, the first region is separate from the second region, and the first region and the second region are configured to rotate with respect to at least one rotation axis, and
wherein the controller is further configured to independently control an inclination angle of at least one of the first region and the second region to allow or block entering of sunlight.

6. The window blind apparatus of claim 5, further comprising:
at least one sunshade which is not equipped with a solar module.

* * * * *